(12) United States Patent
Dong et al.

(10) Patent No.: US 12,008,238 B2
(45) Date of Patent: Jun. 11, 2024

(54) DATA MOVEMENT BASED ON WRITE PENALTIES OF INPUT/OUTPUT PATTERNS ASSOCIATED WITH STORAGE OBJECTS

(71) Applicant: Dell Products L.P., Round Rock, TX (US)

(72) Inventors: Hailan Dong, Chengdu (CN); Chi Chen, Chengdu (CN); Changyue Dai, Chengdu (CN)

(73) Assignee: Dell Products L.P., Round Rock, TX (US)

( * ) Notice: Subject to any disclaimer, the term of this patent is extended or adjusted under 35 U.S.C. 154(b) by 24 days.

(21) Appl. No.: 17/953,556

(22) Filed: Sep. 27, 2022

(65) Prior Publication Data

US 2024/0086069 A1    Mar. 14, 2024

(30) Foreign Application Priority Data

Sep. 13, 2022  (CN) .......................... 202211109224.7

(51) Int. Cl.
   *G06F 3/06*    (2006.01)
(52) U.S. Cl.
   CPC ............ *G06F 3/061* (2013.01); *G06F 3/0653* (2013.01); *G06F 3/0679* (2013.01)
(58) Field of Classification Search
   CPC ....... G06F 3/061; G06F 3/0653; G06F 3/0679
   USPC ....................................................... 711/154
   See application file for complete search history.

(56) References Cited

U.S. PATENT DOCUMENTS

| | | | | |
|---|---|---|---|---|
| 9,940,033 | B1* | 4/2018 | Alshawabkeh | G06F 3/0653 |
| 10,261,717 | B1* | 4/2019 | Martin | G06F 3/065 |
| 10,809,931 | B1* | 10/2020 | Martin | G06F 3/061 |
| 2010/0199036 | A1* | 8/2010 | Siewert | G06F 12/122 |
| | | | | 711/E12.001 |
| 2021/0286542 | A1* | 9/2021 | Dalmatov | G06F 3/0685 |

OTHER PUBLICATIONS

NVM Express, NVM Express, Revision 1.3, NVM Express, May 1, 2017, 282 pages.
Dell EMC, "Dell EMC Unity: FAST Technology Overview," Technical White Paper, Feb. 2021, 38 pages.
Dell Technologies, "Dell EMC VMAX All Flash: Family Overview," Technical White Paper, Sep. 2020, 40 pages.

(Continued)

*Primary Examiner* — Than Nguyen
(74) *Attorney, Agent, or Firm* — Ryan, Mason & Lewis, LLP

(57) ABSTRACT

An apparatus comprises a processing device configured to determine, based on monitoring input/output (IO) operations, an IO activity level and a given IO pattern of a given storage object for a designated period of time, the given storage object being stored on a first storage tier of a storage system. The processing device is also configured to determine a write penalty associated with writing storage objects having the given IO pattern to a second storage tier of the storage system. The processing device is further configured to determine, based on the IO activity level of the given storage object and the determined write penalty, whether to move the given storage object from the first to the second storage tier and to move, responsive to an affirmative movement determination, the given storage object to the second storage tier.

20 Claims, 36 Drawing Sheets

(56) References Cited

OTHER PUBLICATIONS

Dell Technologies, "Dell EMC Unity: Unisphere Overview," Technical White Paper, Feb. 2020, 41 pages.
EMC2, "FAST.X with EMC CloudArray," White Paper, Sep. 2015, 11 pages.
Dell EMC "Dell EMC VMAX All Flash and VMAX3: Reliability, Availability, and Serviceability," Technical White Paper, Dec. 2020, 57 pages.
Dell EMC, "Dell EMC VMAX3 Family," Data Sheet, Nov. 2016, 8 pages.

* cited by examiner

| IO PATTERN | STORAGE TIER | OBJECT IOPS | OBJECT BANDWIDTH (B/W) (MB/S) | DISK IOPS | DISK B/W | IOPS PENALTY | B/W PENALTY |
|---|---|---|---|---|---|---|---|
| 05K_100W_0S | SSD | 447 | 0.218 | 5242 | 21.39 | 11.72 | 98.11 |
| | SAS | 41 | 0.02 | 320 | 1.859 | 7.80 | 92.95 |
| | NLSAS | 27 | 0.013 | 504 | 7.71 | 18.67 | 593.08 |
| 05K_100W_100S | SSD | 485 | 0.237 | 2909 | 1.416 | 5.99 | 5.97 |
| | SAS | 112 | 0.055 | 671 | 2.63 | 5.99 | 47.81 |
| | NLSAS | 135 | 0.066 | 811 | 3.183 | 6 | 48.22 |
| 4K_100W_0S | SSD | 497 | 1.94 | 5840 | 33.94 | 11.75 | 17.49 |
| | SAS | 21 | 0.08 | 244 | 1.4331 | 11.61 | 17.91 |
| | NLSAS | 51 | 0.19 | 598 | 3.494 | 11.72 | 18.38 |
| 4K_100W_100S | SSD | 679 | 2.65 | 4073 | 19.73 | 5.99 | 7.44 |
| | SAS | 252 | 0.98 | 1497 | 7.26 | 5.94 | 7.41 |
| | NLSAS | 181 | 0.7 | 1060 | 4.144 | 5.85 | 5.92 |
| 64K_100W_0S | SSD | 292 | 18.26 | 3447 | 123.34 | 11.80 | 6.75 |
| | SAS | 42 | 2.64 | 259 | 9.35 | 6.17 | 3.54 |
| | NLSAS | 22 | 1.39 | 492 | 17.7 | 22.36 | 12.73 |
| 64K_100W_100S | SSD | 342 | 21.41 | 2128 | 133.02 | 6.22 | 6.21 |
| | SAS | 68 | 4.28 | 408 | 25.68 | 6 | 6 |
| | NLSAS | 65 | 4.1 | 384 | 24.14 | 5.9 | 5.88 |

FIG. 10

| STORAGE OBJECT | IO ACTIVITY | IO PATTERN | CURRENT TIER |
|---|---|---|---|
| $u_1$ | 88 | P1(05K_100W_0S) | NLSAS |
| $u_2$ | 80 | P2(05K_100W_100S) | SAS |
| $u_3$ | 50 | P3(4K_100W_0S) | NLSAS |
| $u_4$ | 70 | P4(4K_100W_100S) | NLSAS |
| $u_5$ | 100 | P5(64K_100W_0S) | SSD |
| $u_6$ | 125 | P6(64K_100W_100S) | SSD |

FIG. 12

| IO PATTERN | STORAGE TIER | IOPS PENALTY | BANDWIDTH PENALTY | COMPREHENSIVE WRITE PENALTY AMONG K TIERS | STANDARD DEVIATION $\sigma_j$ |
|---|---|---|---|---|---|
| 05K_100W_0S | SSD | 11.72 | 98.11 | 0.38 | 0.178 |
| | SAS | 7.80 | 92.95 | 0.48 | |
| | NLSAS | 18.67 | 593.08 | 0.14 | |
| 05K_100W_100S | SSD | 5.99 | 5.97 | 0.57 | 0.202 |
| | SAS | 5.99 | 47.81 | 0.21 | |
| | NLSAS | 6 | 48.22 | 0.22 | |
| 4K_100W_0S | SSD | 11.75 | 17.49 | 0.34 | 0.004 |
| | SAS | 11.61 | 17.91 | 0.33 | |
| | NLSAS | 11.72 | 18.38 | 0.33 | |
| 4K_100W_100S | SSD | 5.99 | 7.44 | 0.32 | 0.024 |
| | SAS | 5.94 | 7.41 | 0.32 | |
| | NLSAS | 5.85 | 5.92 | 0.36 | |
| 64K_100W_0S | SSD | 11.80 | 6.75 | 0.29 | 0.204 |
| | SAS | 6.17 | 3.54 | 0.55 | |
| | NLSAS | 22.36 | 12.73 | 0.16 | |
| 64K_100W_100S | SSD | 6.22 | 6.21 | 0.32 | 0.009 |
| | SAS | 6 | 6 | 0.33 | |
| | NLSAS | 5.9 | 5.88 | 0.35 | |

FIG. 13

| STORAGE OBJECT | IO PATTERN | IO ACTIVITY | CURRENT TIER | ORIGINAL RELOCATION BASED ON IO ACTIVITY | COMPREHENSIVE SCORE $s_{ij}$ WITH IO ACTIVITY AND WRITE PENALTY | CURRENT RELOCATION COMBINING THE WRITE PENALTY |
|---|---|---|---|---|---|---|
| $u_1$ | P1 (05K_100W_0S) | 88 | NLSAS | NLSAS->SAS | 104 | NLSAS->SSD |
| $u_2$ | P2 (05K_100W_100S) | 80 | SAS | SAS->SAS | 96.2 | SAS->SAS |
| $u_3$ | P3 (4K_100W_0S) | 50 | NLSAS | NLSAS->NLSAS | 50.2 | NLSAS-> NLSAS |
| $u_4$ | P4 (4K_100W_100S) | 70 | NLSAS | NLSAS->NLSAS | 71.7 | NLSAS->NLSAS |
| $u_5$ | P5 (64K_100W_0S) | 100 | SSD | SSD->SSD | 120 | SSD->SSD |
| $u_6$ | P6 (64K_100W_100S) | 125 | SSD | SSD->SSD | 126 | SSD->SSD |

FIG. 14

DATA MOVEMENT BASED ON WRITE PENALTIES OF INPUT/OUTPUT PATTERNS ASSOCIATED WITH STORAGE OBJECTS

RELATED APPLICATION

The present application claims priority to Chinese Patent Application No. 202211109224.7, filed on Sep. 13, 2022 and entitled "Data Movement Based on Write Penalties of Input/Output Patterns Associated With Storage Objects," which is incorporated by reference herein in its entirety.

FIELD

The field relates generally to information processing, and more particularly to storage in information processing systems.

BACKGROUND

Storage arrays and other types of storage systems are often shared by multiple host devices over a network. Applications running on the host devices each include one or more processes that perform the application functionality. Such processes issue input/output (IO) operation requests for delivery to the storage systems. Storage controllers of the storage systems service such requests for IO operations. In some information processing systems, multiple storage systems may be used to form a storage cluster.

SUMMARY

Illustrative embodiments of the present disclosure provide techniques for data movement in a storage system based at least in part on write penalties of input/output patterns associated with storage objects.

In one embodiment, an apparatus comprises at least one processing device comprising a processor coupled to a memory. The at least one processing device is configured to perform the step of determining, based at least in part on monitoring input/output operations for a given storage object for a designated period of time, an input/output activity level and a given input/output pattern of the given storage object for the designated period of time, the given storage object being stored utilizing a first type of storage resources associated with a first one of two or more storage tiers in a storage system. The at least one processing device is also configured to perform the step of determining a write penalty of the given input/output pattern, the write penalty of the given input/output pattern being associated with writing storage objects having the given input/output pattern to at least a second type of storage resources associated with a second one of the two or more storage tiers in the storage system. The at least one processing device is further configured to perform the step of determining, based at least in part on the input/output activity level of the given storage object and the write penalty of the given input/output pattern, whether to move the given storage object from being stored utilizing the first type of storage resources associated with the first one of the two or more storage tiers in the storage system to being stored utilizing the second type of storage resources associated with the second one of the two or more storage tiers in the storage system. The at least one processing device is further configured to perform the step of moving, responsive to an affirmative movement determination, the given storage object to the second type of storage resources associated with the second one of the two or more storage tiers in the storage system.

These and other illustrative embodiments include, without limitation, methods, apparatus, networks, systems and processor-readable storage media.

BRIEF DESCRIPTION OF THE DRAWINGS

FIG. 10 shows a table of different performance metrics for different input/output patterns on different storage tiers in an illustrative embodiment.

FIG. 12 shows a table of storage objects with different input/output activity levels and input/output patterns on different storage tiers in an illustrative embodiment.

FIG. 13 shows a table of input/output pattern write penalty analysis for different input/output patterns on different storage tiers in an illustrative embodiment.

FIG. 14 shows a table of recommendations for relocating storage objects with different input/output patterns and different input/output activity levels across different storage tiers in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
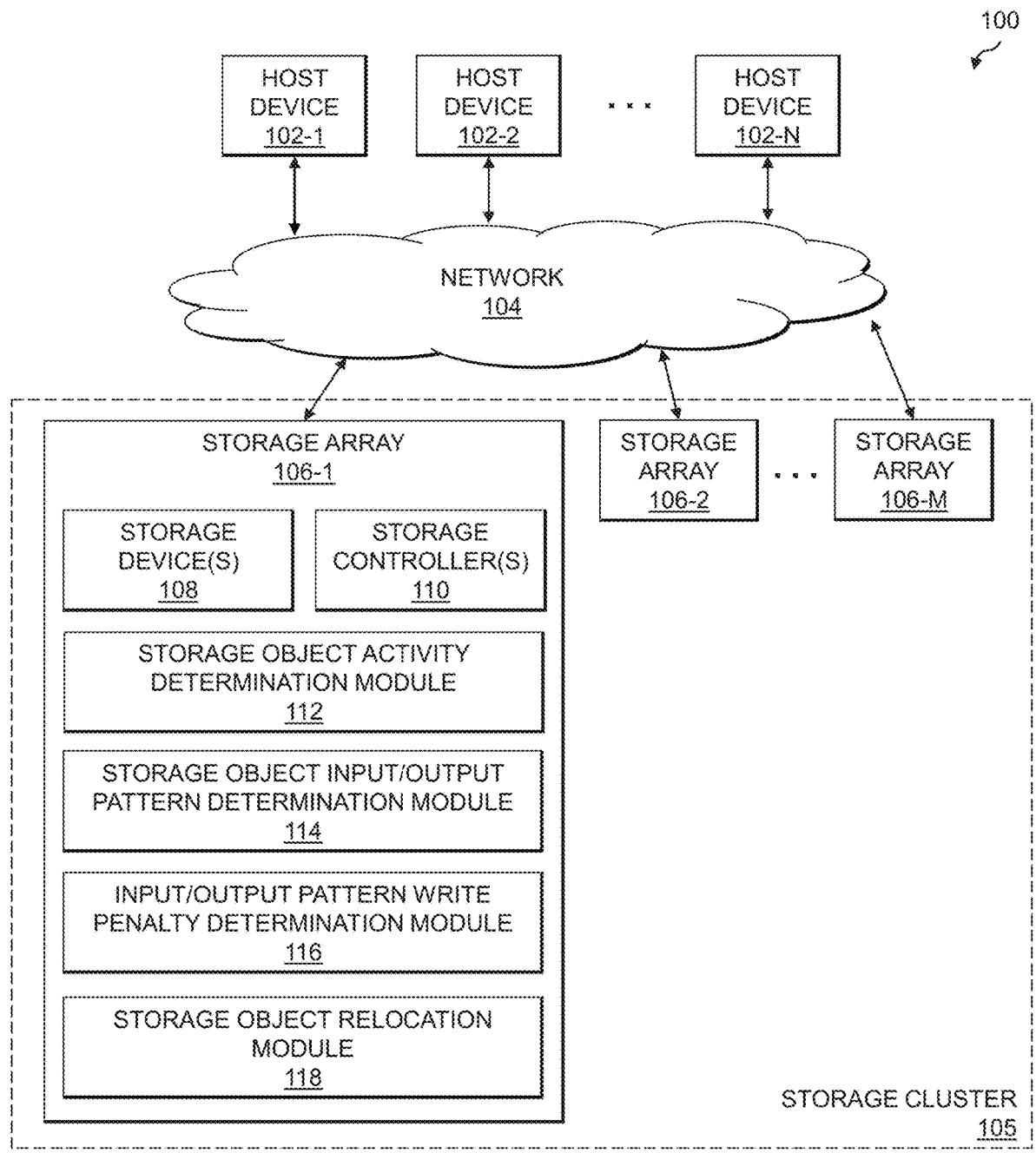
FIG. 1 is a block diagram of an information processing system configured for data movement in a storage system based at least in part on write penalties of input/output patterns associated with storage objects in an illustrative embodiment.

FIG. 1 shows an information processing system 100 configured in accordance with an illustrative embodiment to provide functionality for data movement based at least in part on write penalties of input/output patterns associated with storage objects. The information processing system 100 comprises one or more host devices 102-1, 102-2, ... 102-N (collectively, host devices 102) that communicate over a network 104 with one or more storage arrays 106-1, 106-2, ... 106-M (collectively, storage arrays 106). The network 104 may comprise a storage area network (SAN).

The storage array 106-1, as shown in FIG. 1, comprises a plurality of storage devices 108 each storing data utilized by one or more applications running on the host devices 102. The storage devices 108 are illustratively arranged in one or more storage pools. The storage array 106-1 also comprises one or more storage controllers 110 that facilitate input/output (IO) processing for the storage devices 108. The storage array 106-1 and its associated storage devices 108 are an example of what is more generally referred to herein as a "storage system." This storage system in the present embodiment is shared by the host devices 102, and is therefore also referred to herein as a "shared storage system." In embodiments where there is only a single host device 102, the host device 102 may be configured to have exclusive use of the storage system.

The host devices 102 illustratively comprise respective computers, servers or other types of processing devices capable of communicating with the storage arrays 106 via the network 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model, a Function-as-a-Service (FaaS) model and/or a Storage-as-a-Service (STaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The storage devices 108 of the storage array 106-1 may implement logical units (LUNs) configured to store objects for users associated with the host devices 102. These objects can comprise files, blocks or other types of objects. The host devices 102 interact with the storage array 106-1 utilizing read and write commands as well as other types of commands that are transmitted over the network 104. Such commands in some embodiments more particularly comprise Small Computer System Interface (SCSI) commands, although other types of commands can be used in other embodiments. A given IO operation as that term is broadly used herein illustratively comprises one or more such commands. References herein to terms such as "input/output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage array 106-1 to include different portions of one or more physical storage devices. Storage devices 108 may therefore be viewed as comprising respective LUNs or other logical storage volumes.

The storage devices 108 of the storage array 106-1 can be implemented using solid state drives (SSDs). Such SSDs are implemented using non-volatile memory (NVM) devices such as flash memory. Other types of NVM devices that can be used to implement at least a portion of the storage devices 108 include non-volatile random access memory (NVRAM), phase-change RAM (PC-RAM) and magnetic RAM (MRAM). These and various combinations of multiple different types of NVM devices or other storage devices may also be used. For example, hard disk drives (HDDs) can be used in combination with or in place of SSDs or other types of NVM devices. Accordingly, numerous other types of electronic or magnetic media can be used in implementing at least a subset of the storage devices 108.

In the information processing system 100 of FIG. 1, the storage arrays 106 are assumed to be part of a storage cluster 105 (e.g., where the storage arrays 106 may be used to implement one or more storage nodes in a cluster storage system comprising a plurality of storage nodes interconnected by one or more networks), and the host devices 102 are assumed to submit IO operations (e.g., as part of storage workloads of one or more applications running on the host devices 102) to be processed by the storage cluster 105. At least one of the storage controllers of the storage arrays 106 (e.g., the storage controller 110 of storage array 106-1) is assumed to implement functionality for intelligent storage object relocation across the storage devices 108 of the storage array 106-1 (e.g., between different ones of the storage devices 108 or portions thereof, where in some cases the different storage devices 108 are part of or provide storage resources for different storage tiers in the storage cluster 105), and between the storage array 106-1 and one or more other ones of the storage arrays 106-2 through 106-M. Such intelligent storage object relocation functionality is provided via a storage object activity determination module 112, a storage object IO pattern determination module 114, an IO pattern write penalty determination module 116, and a storage object relocation module 118.

The storage object activity determination module 112 is configured to determine, based at least in part on monitoring IO for a given storage object for a designated period of time, an IO activity level of the given storage object for the designated period of time. The given storage object is stored utilizing a first type of storage resources associated with a first one of two or more storage tiers in the storage cluster 105. The storage object IO pattern determination module 114 is configured to determine, based at least in part on the monitored IO operations for the given storage object for the designated period of time, a given IO pattern associated with the given storage object. The IO pattern write penalty determination module 116 is configured to determine a write penalty of the given IO pattern, the write penalty of the given IO pattern being associated with writing storage objects having the given IO pattern to at least a second type of storage resources associated with a second one of the two or more storage tiers in the storage cluster 105. The storage object relocation module 118 is configured to determine, based at least in part on the IO activity level of the given storage object and the write penalty of the given IO pattern, whether to move the given storage object from being stored utilizing the first type of storage resources associated with the first one of the two or more storage tiers in the storage cluster 105 to being stored utilizing the second type of storage resources associated with the second one of the two or more storage tiers in the storage cluster 105. The storage object relocation module 118 is also configured to move, responsive to an affirmative movement determination, the given storage object to the second type of storage resources associated with the second one of the two or more storage tiers in the storage cluster 105.

Although in the FIG. 1 embodiment the storage object activity determination module 112, the storage object IO pattern determination module 114, the IO pattern write penalty determination module 116, and the storage object relocation module 118 are shown as being implemented internal to the storage array 106-1 and outside the storage controllers 110, in other embodiments one or more of the storage object activity determination module 112, the storage object IO pattern determination module 114, the IO pattern write penalty determination module 116, and the storage object relocation module 118 may be implemented at least partially internal to the storage controllers 110 or at least partially outside the storage array 106-1, such as on one of the host devices 102, one or more other ones of the storage arrays 106-2 through 106-M, on one or more servers external to the host devices 102 and the storage arrays 106 (e.g., including on a cloud computing platform or other type of information technology (IT) infrastructure), etc. Further, although not shown in FIG. 1, other ones of the storage arrays 106-2 through 106-M may implement respective instances of one or more of the storage object activity determination module 112, the storage object IO pattern determination module 114, the IO pattern write penalty determination module 116, and the storage object relocation module 118.

At least portions of the functionality of the storage object activity determination module 112, the storage object IO pattern determination module 114, the IO pattern write penalty determination module 116, and the storage object relocation module 118 may be implemented at least in part in the form of software that is stored in memory and executed by a processor.

As noted above, the storage arrays 106 in some embodiments are assumed to be part of the storage cluster 105. The storage cluster 105 is assumed to provide or implement multiple distinct storage tiers of a multi-tier storage system. By way of example, a given multi-tier storage system may comprise a fast tier or performance tier implemented using flash storage devices or other types of SSDs, and a capacity tier implemented using HDDs, possibly with one or more such tiers being server based. A wide variety of other types of storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, SSDs, HDDs, flash drives, hybrid drives or other types of storage products and devices, or portions thereof, and illustratively include logical storage devices such as LUNs.

It should be appreciated that a multi-tier storage system may include more than two storage tiers, such as one or more "performance" tiers and one or more "capacity" tiers, where the performance tiers illustratively provide increased IO performance characteristics relative to the capacity tiers and the capacity tiers are illustratively implemented using relatively lower cost storage than the performance tiers. There may also be multiple performance tiers, each providing a different level of service or performance as desired, or multiple capacity tiers.

The host devices 102 and storage arrays 106 in the FIG. 1 embodiment are assumed to be implemented using at least one processing platform, with each processing platform comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage arrays 106 may be implemented on respective distinct processing platforms, although numerous other arrangements are possible. For example, in some embodiments at least portions of one or more of the host devices 102 and one or more of the storage arrays 106 are implemented on the same processing platform. One or more of the storage arrays 106 can therefore be implemented at least in part within at least one processing platform that implements at least a subset of the host devices 102.

The network 104 may be implemented using multiple networks of different types to interconnect storage system components. For example, the network 104 may comprise a SAN that is a portion of a global computer network such as the Internet, although other types of networks can be part of the SAN, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Although in some embodiments certain commands used by the host devices 102 to communicate with the storage arrays 106 illustratively comprise SCSI commands, other types of commands and command formats can be used in other embodiments. For example, some embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

The storage array 106-1 in the present embodiment is assumed to comprise a persistent memory that is implemented using a flash memory or other type of non-volatile memory of the storage array 106-1. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 108 of the storage array 106-1, although in other embodiments the persistent memory may be implemented as a designated portion or portions of one or more of the storage devices 108. For example, in some embodiments the storage devices 108 may comprise flash-based storage devices, as in embodiments involving all-flash storage arrays, or may be implemented in whole or in part using other types of non-volatile memory.

As mentioned above, communications between the host devices 102 and the storage arrays 106 may utilize PCIe connections or other types of connections implemented over one or more networks. For example, illustrative embodiments can use interfaces such as Internet SCSI (iSCSI), Serial Attached SCSI (SAS) and Serial ATA (SATA). Numerous other interfaces and associated communication protocols can be used in other embodiments.

The storage arrays 106 in some embodiments may be implemented as part of a cloud-based system.

It should therefore be apparent that the term "storage array" as used herein is intended to be broadly construed, and may encompass multiple distinct instances of a commercially-available storage array.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

In some embodiments, a storage system comprises first and second storage arrays arranged in an active-active configuration. For example, such an arrangement can be used to ensure that data stored in one of the storage arrays is replicated to the other one of the storage arrays utilizing a synchronous replication process. Such data replication across the multiple storage arrays can be used to facilitate failure recovery in the system 100. One of the storage arrays may therefore operate as a production storage array relative to the other storage array which operates as a backup or recovery storage array.

It is to be appreciated, however, that embodiments disclosed herein are not limited to active-active configurations or any other particular storage system arrangements. Accordingly, illustrative embodiments herein can be configured using a wide variety of other arrangements, including, by way of example, active-passive arrangements, active-active Asymmetric Logical Unit Access (ALUA) arrangements, and other types of ALUA arrangements.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and one or more associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. The storage arrays 106 may be implemented at least in part in the first geographic location, the second geographic location, and one or more other geographic locations. Thus, it is possible in some implementations of the system 100 for different ones of the host devices 102 and the storage arrays 106 to reside in different data centers.

Numerous other distributed implementations of the host devices 102 and the storage arrays 106 are possible. Accordingly, the host devices 102 and the storage arrays 106 can also be implemented in a distributed manner across multiple data centers.

Additional examples of processing platforms utilized to implement portions of the system 100 in illustrative embodiments will be described in more detail below in conjunction with FIGS. 16 and 17.

It is to be understood that the particular set of elements shown in FIG. 1 for data movement based at least in part on write penalties of IO patterns associated with storage objects is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

Figure 2:
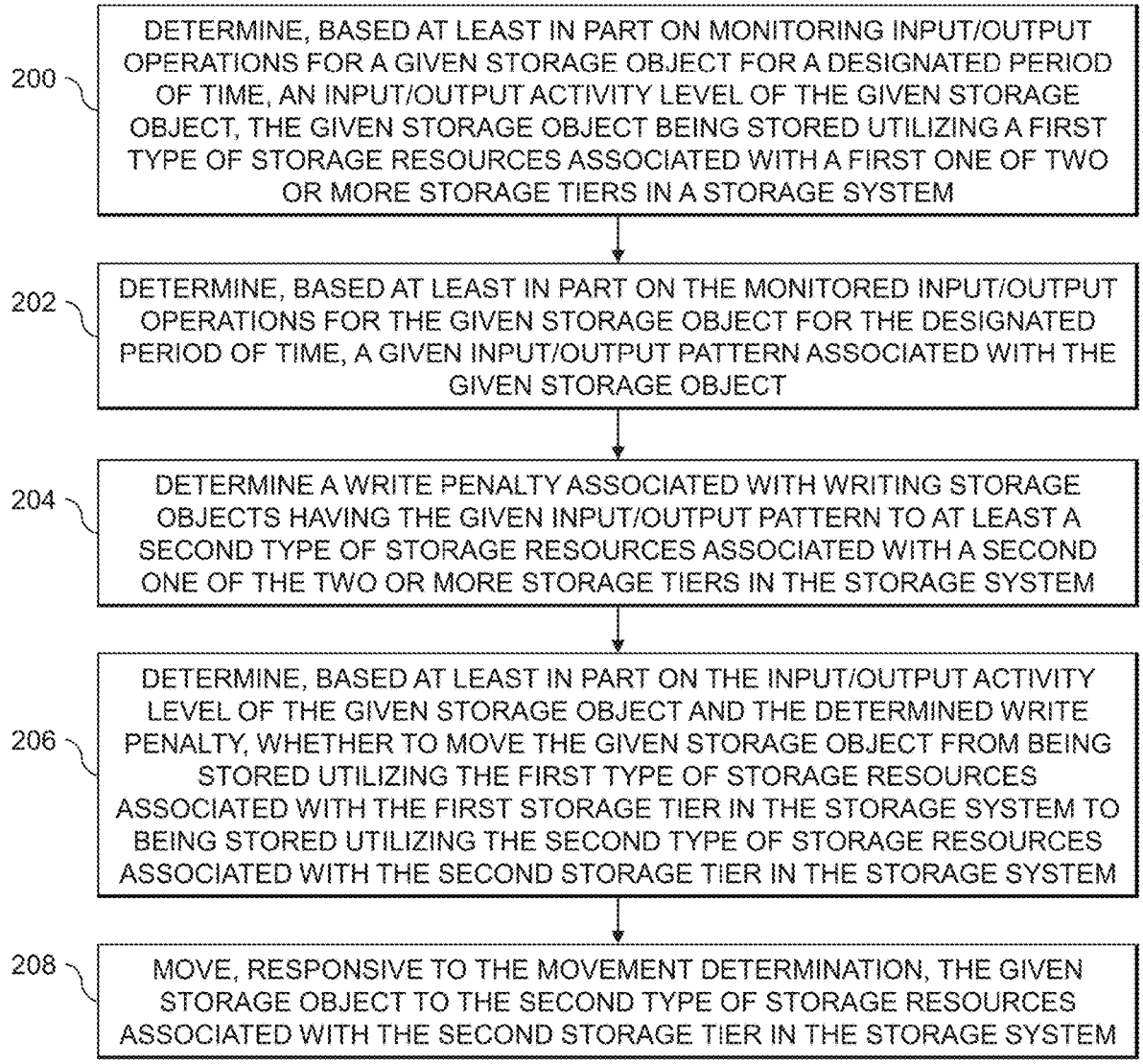
FIG. 2 is a flow diagram of an exemplary process for data movement in a storage system based at least in part on write penalties of input/output patterns associated with storage objects in an illustrative embodiment.

An exemplary process for data movement in a storage system based at least in part on write penalties of IO patterns associated with storage objects will now be described in more detail with reference to the flow diagram of FIG. 2. It is to be understood that this particular process is only an example, and that additional or alternative processes for data movement in a storage system based at least in part on write penalties of IO patterns associated with storage objects may be used in other embodiments.

In this embodiment, the process includes steps 200 through 208. These steps are assumed to be performed by the storage object activity determination module 112, the storage object IO pattern determination module 114, the IO pattern write penalty determination module 116, and the storage object relocation module 118. The process begins with step 200, determining, based at least in part on monitoring IO operations for a given storage object for a designated period of time, an IO activity level of the given storage object for the designated period of time, the given storage object being stored utilizing a first type of storage resources associated with a first one of two or more storage tiers in a storage system. The IO activity level of the given storage object may be determined based at least in part on a count of the monitored IO operations for the given storage object for the designated period of time. The storage system may comprise a clustered storage system comprising two or more storage arrays, wherein a first one of the two or more storage arrays provides at least a portion of the first type of storage resources associated with the first one of the two or more storage tiers in the storage system and a second one of the two or more storage arrays provides at least a portion of the second type of storage resources associated with the second one of the two or more storage tiers in the storage system.

In step 202, a given IO pattern associated with the given storage object is determined based at least in part on the monitored IO operations for the given storage object for the designated period of time. Determining the given IO pattern associated with the given storage object may be based at least in part on: a size of the given storage object; a ratio of read operations to write operations for the given storage object for the designated period of time; and a ratio of sequential IO operations to random IO operations involving the given storage object for the designated period of time.

A write penalty of the given IO pattern is determined in step 204. The write penalty of the given IO pattern is associated with writing storage objects having the given IO pattern to at least a second type of storage resources associated with a second one of the two or more storage tiers in the storage system. Determining the write penalty of the given IO pattern may comprise evaluating write performance of a set of storage objects having the classified IO pattern that are written to the second type of storage resources associated with the second one of the two or more storage tiers in the storage system.

In step 206, a determination of whether to move the given storage object from being stored utilizing the first type of storage resources associated with the first one of the two or more storage tiers in the storage system to being stored utilizing the second type of storage resources associated with the second one of the two or more storage tiers in the storage system is made. The step 206 determination is based at least in part on the IO activity level of the given storage object and the write penalty of the given IO pattern. The given storage object is moved to the second type of storage resources associated with the second one of the two or more storage tiers in the storage system in step 208 responsive to the step 206 determination.

In some embodiments, step 204 also includes determining a write penalty associated with writing storage objects having the given IO pattern to a third type of storage resources associated with a third one of the two or more storage tiers in the storage system, and the step 206 determination may include selecting, based at least in part on the write penalties associated with writing storage objects having the given IO pattern to the second and third types of storage resources associated with the second and third ones of the two or more storage tiers in the storage system, whether to move the given storage object to being stored utilizing the second type of storage resources associated with the second one of the two or more storage tiers in the storage system or the third type of storage resources associated with the third one of the two or more storage tiers in the storage system.

Determining whether to move the given storage object from being stored utilizing the first type of storage resources associated with the first one of the two or more storage tiers in the storage system to being stored utilizing the second type of storage resources associated with the second one of the two or more storage tiers in the storage system in step 206 may be responsive to determining that a performance improvement of the storage system resulting from movement of the given storage object from being stored utilizing the first type of storage resources associated with the first one of the two or more storage tiers in the storage system offsets at least a designated threshold amount of the determined write penalty.

In some embodiments, the first one of the two or more storage tiers in the storage system provides a first performance level that is less than a second performance level provided by the second one of the two or more storage tiers in the storage system and the step 206 determination is responsive to determining that the IO activity level of the given storage object provides at least a designated threshold performance improvement, such as a designated threshold performance improvement that offsets at least a designated threshold amount of the determined write penalty.

In other embodiments, the first one of the two or more storage tiers in the storage system provides a first performance level that is greater than a second performance level provided by the second one of the two or more storage tiers in the storage system and the step 206 determination is responsive to determining that the IO activity level of the given storage object provides at least a designated threshold performance savings for the first one of the two or more storage tiers in the storage system, such as a designated threshold performance savings for the first one of the two or more storage tiers in the storage system that offsets at least a designated threshold amount of the determined write penalty.

In a data center or other type of IT infrastructure including cloud computing platforms, there may be many different storage arrays each with their own characteristics and advantages for different types of workloads. For example, a data center associated with a business or other enterprise may offer comprehensive services to customers or other users with high quality through leveraging the different characteristics of such storage arrays, including different characteristics of storage devices within each of the storage arrays. In some cases, storage arrays are part of a clustered storage system (also referred to herein as a storage cluster, a storage array cluster or an array cluster).

At the array cluster level, as business needs change, the "hot degree" of different data may be changing continuously. The hot degree or IO temperature may characterize data access frequency (e.g., a number of IO requests within a designated threshold of a current time), or other types of IO metrics. Because of such changes in hot degree, data that currently resides on a high performance storage array may become cold while data which resides on a low performance storage array may become hot. To optimize performance, there is thus a need for self-service data movement between different arrays in an array cluster (e.g., according to data access frequency). Such self-service data movement may include breaking the barrier among storage arrays in the array cluster, moving hot data to high performance storage arrays, archiving cold data to lower performance storage arrays, etc. This advantageously provides various benefits to the customers or other end-users (e.g., increasing performance, reducing cost, improving storage utilization efficiency and speeding up customer business processing in the array cluster, etc.).

For some storage arrays and array clusters, data movement functionality may be used to extend storage tiering among different storage arrays or platforms and cloud storage platforms, to move data among heterogeneous storage resources, to fully utilize storage resources at the storage cluster level and possibly across data centers, etc. In some storage arrays, such data movement functionality may include Fully Automated Storage Tiering (FAST) technology, as well as extensions thereof referred to as FAST Sideways or FAST.X. For example, a Dell EMC VMAX storage array may implement FAST hinting, which provides users with a way to accelerate mission critical processes based on business priority and other service level objectives (SLOs). FAST hinting is advantageously application aware, and leverages storage and performance analyzers to monitor the read and write status of different workloads to send hints to storage arrays for data that is likely to be accessed in a given period of time. An IT administrator may create FAST hint profiles, which are given a priority and scheduled one-off, ongoing, or on a recurring frequency (e.g., daily, weekly, monthly, etc.) along with an expected execution duration. Such hints may be provided via an analytics tab of analytics software of a storage array (e.g., a database storage analyzer interface in Unisphere for a VMAX array).

Based on provided hints, a performance analyzer can watch for increased workload demands before taking action. For example, FAST can receive hints from a database storage analyzer through a hint manager application programming interface (API) and proactively adjust the storage device mix according to a priority set (e.g., a mix of flash and serial attached SCSI (SAS) storage devices). The storage device mix may be automatically adjusted, and is subject to keeping SLOs intact and does not override previous SLOs. FAST or other data movement functionality provides capabilities for delivering leading edge application-aware functionality for customers or end-users that require the best response times for mission-critical applications in specific business periods.

In addition to optimization through FAST hinting, data services may also extend beyond a storage array itself and across the data center through FAST.X. FAST.X advantageously evolves and extends storage tiering and service-level management to other storage platforms as well as cloud storage. FAST.X enables data movement across storage technologies provided by various block devices (e.g., including Dell EMC XtremIO, VNX, CloudArray and other types of storage). FAST.X simplifies management and operations, and consolidates heterogeneous storage under its control. FAST.X further extends SLO management to external storage arrays as well. Enabling SLO management across external storage arrays enables easy integration for different appliances as needed by different workloads and requirements. FAST.X may simplify management at scale, providing workload optimization across storage arrays with the same simplicity as internal SLO provisioning. The advanced automation of FAST optimizes customer or other end-user workloads to automatically apply the necessary amounts of resources, and FAST.X extends this capability to external storage arrays according to the same specified performance and availability criteria. As noted above, FAST.X may also be integrated with cloud storage, such as to move less active workloads to more cost-efficient cloud storage.

As discussed above, FAST.X technology may be used to extend storage tiering among different storage platforms and the cloud, enabling movement of data among heterogeneous storage to more fully utilize storage resources at a storage cluster level and even at a data center level. FAST.X technology may be used to move "hot" data (e.g., data with high access frequency) to high performance storage arrays, while "cold" data (e.g., data with low access frequency) is archived to cost-saving lower performance storage arrays. This can provide significant benefits to end-users, improving storage system utilization efficiency and speeding up end-user processing in a storage cluster.

FAST for Virtual Pools (FAST-VP) provides a relocation algorithm which relocates slices (e.g., data extents) or other storage objects based on IO frequency, moving "hotter" slices to higher performance storage tiers and moving "colder" slices to lower performance storage tiers. After data flush to disks, however, each IO pattern's write penalty may differ on different storage tiers. The write penalty may result from various factors, such as the backend disks' Redundant Array of Independent Disks (RAID) group type, disk block size, etc. If the write penalty for backend disks is too heavy to keep the disks' load in a reasonable range, the data flush resulting from slice or other storage object relocation may lead to degraded performance of a storage system.

Illustrative embodiments provide technical solutions that improve the efficiency of FAST-VP and other types of storage object relocation mechanisms (e.g., for both intra- and inter-storage array data movement) by taking into account both IO access frequency of storage objects as well as the backend write penalty. The technical solutions described herein thus enable slice or other storage object relocation to storage tiers which have smaller write penalties for the IO patterns exhibited by the slices or other storage objects. Advantageously, use of the technical solutions described herein reduces the storage system's backend disks' IO operations per second (IOPS) and data traffic thereby improving storage system performance.

For storage systems, the write penalty is inherent in RAID data protection techniques, which require multiple disk IO requests for each application write request. RAID data protection techniques may vary from minimal (e.g., mirrored arrays) to more substantial (e.g., RAID level 5, RAID level 6, etc.).

Relocation decision algorithms may base relocation decisions or recommendations on the IO activity of storage objects. FAST-VP approaches, for example, may base a relocation decision algorithm on the IO activity level of each slice (e.g., the granularity of FAST-VP relocation). In FAST-VP, a slice of data is considered "hotter" (e.g., more activity) or "colder" (e.g., less activity) than another slice of data based on the relative activity levels of those slices. Activity level may be determined in various ways. One approach is to count the number of IO operations for a slice or other storage object (e.g., reads and writes bound for each slice or other storage object). In some implementations, FAST-VP classifies storage devices into three categories or storage tiers: an extreme performance tier (e.g., comprised of flash drives, SSDs, etc.); a performance tier (e.g., comprised of serial attached SCSI (SAS) drives); and a capacity tier (e.g., comprised of Near-Line SAS (NL-SAS) drives).

FAST-VP can help to reduce the Total Cost of Ownership (TCO) of a storage system by maintaining performance while efficiently utilizing the configuration of a storage pool. Instead of creating a pool with one type of drive, by mixing different types of drives (e.g., flash, SAS and NL-SAS) FAST-VP can help reduce the cost of a storage system configuration by reducing drive counts and leveraging larger capacity drives. Data requiring the highest level of performance may be tiered to a flash or extreme performance storage tier, while data with less activity may be tiered to SAS or NL-SAS drives on performance or capacity storage tiers.

Figure 3:
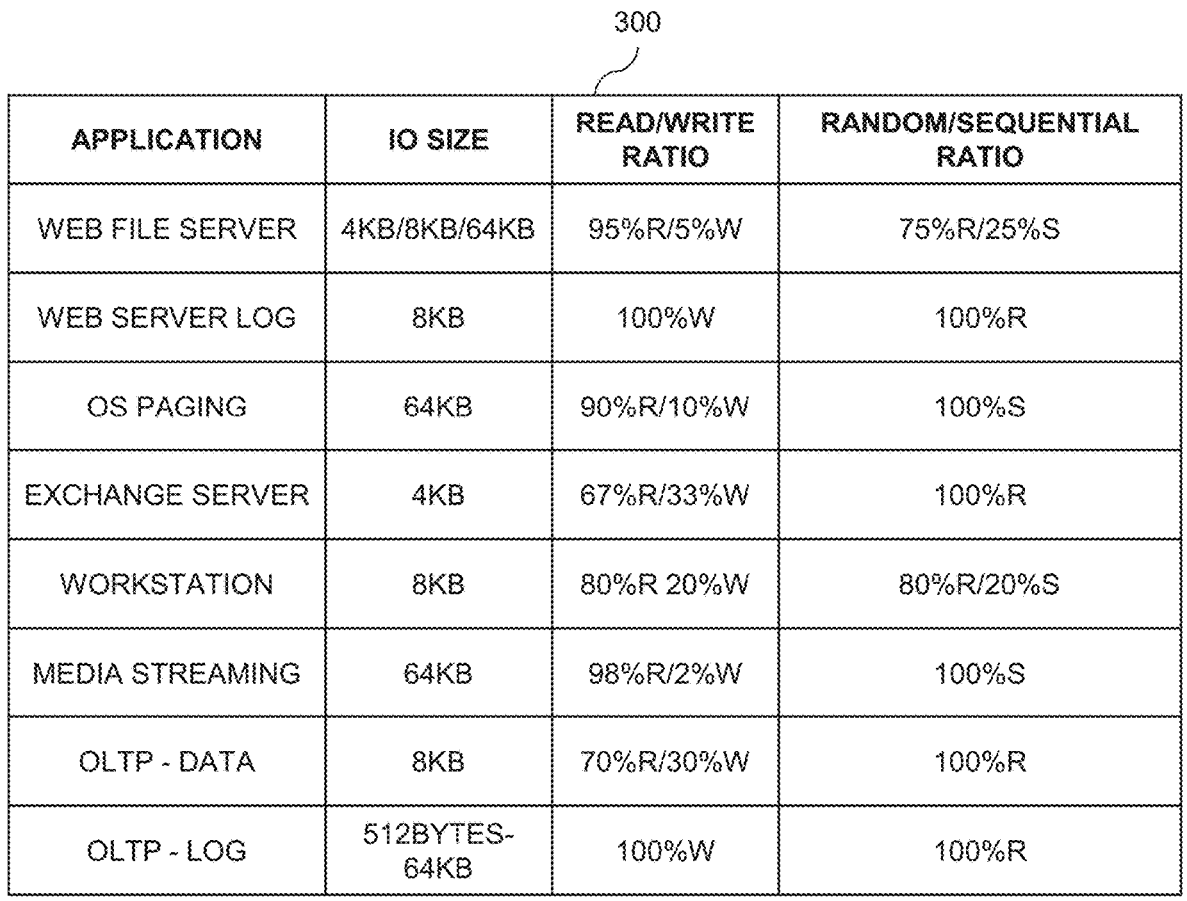
FIG. 3 shows a table of characteristics of different storage workloads in an illustrative embodiment.
Figure 4A:
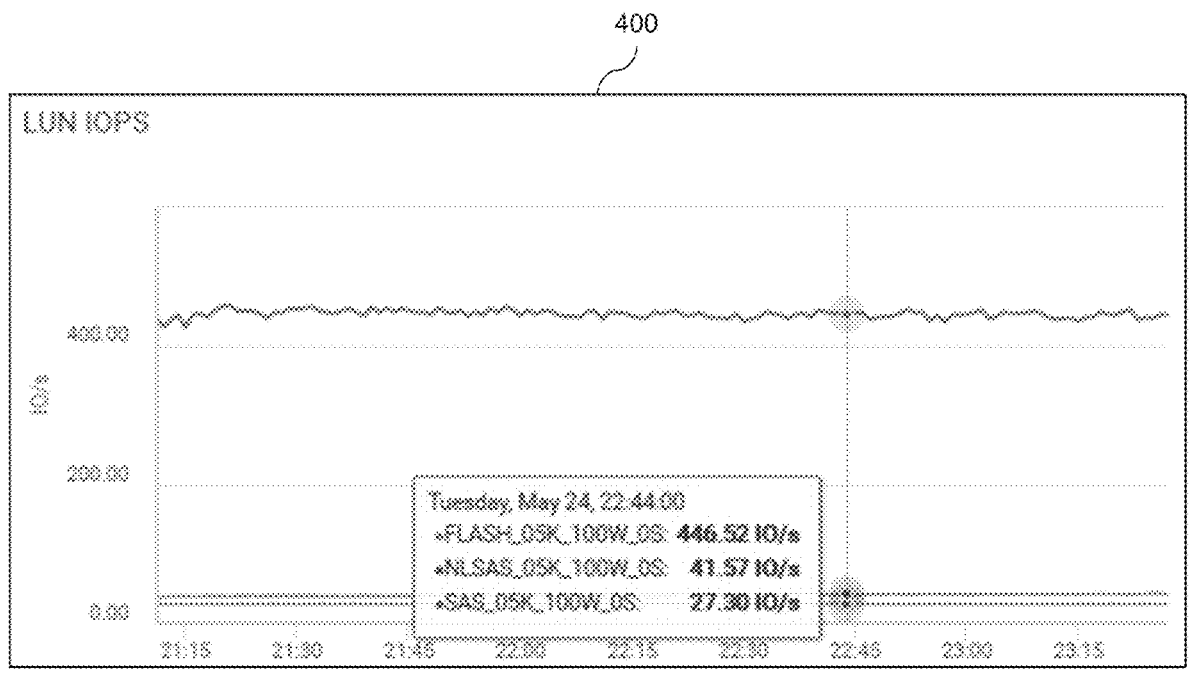
FIGS. 4A-4H show plots of different performance metrics for an input/output pattern on different storage tiers in an illustrative embodiment.
Figure 4B:
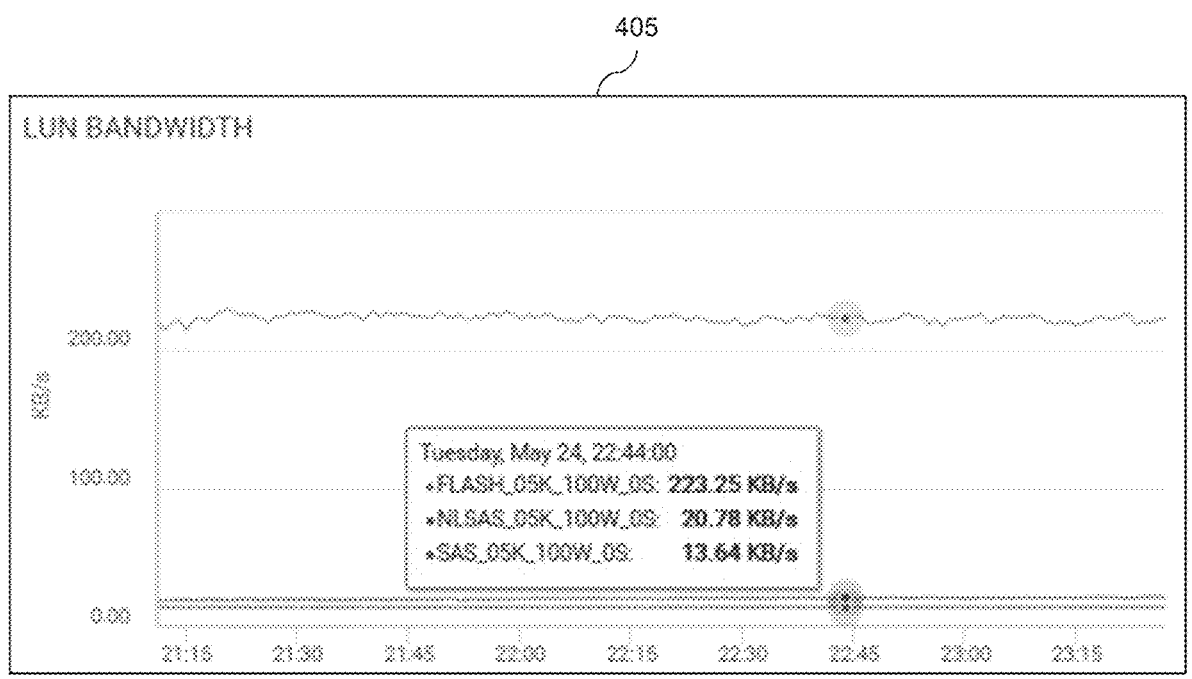
Figure 4C:
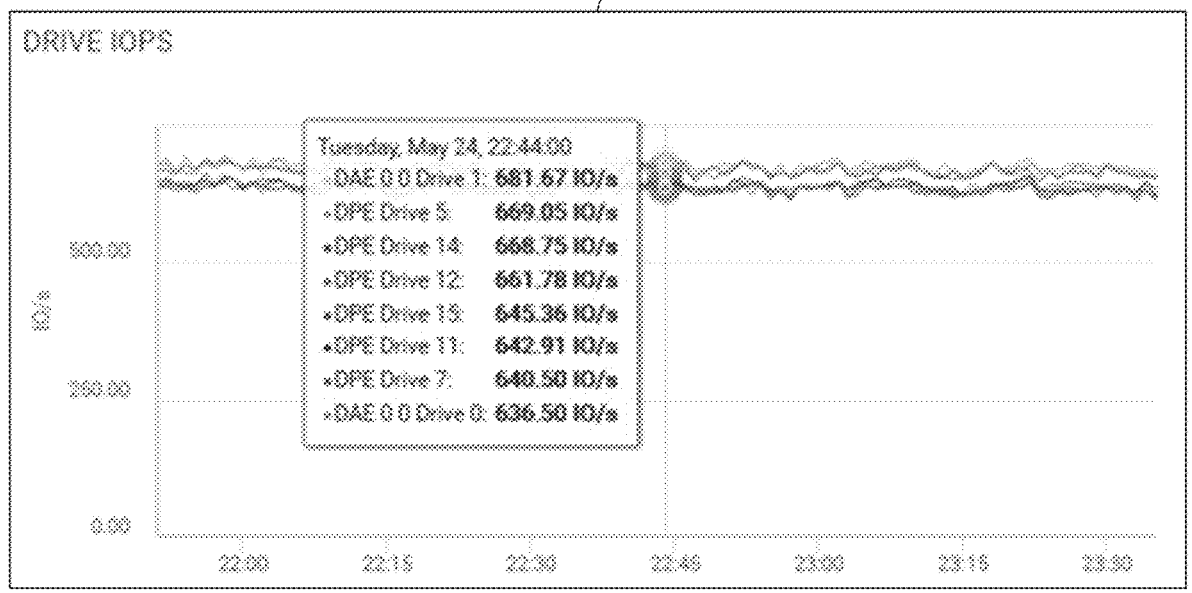
Figure 4D:
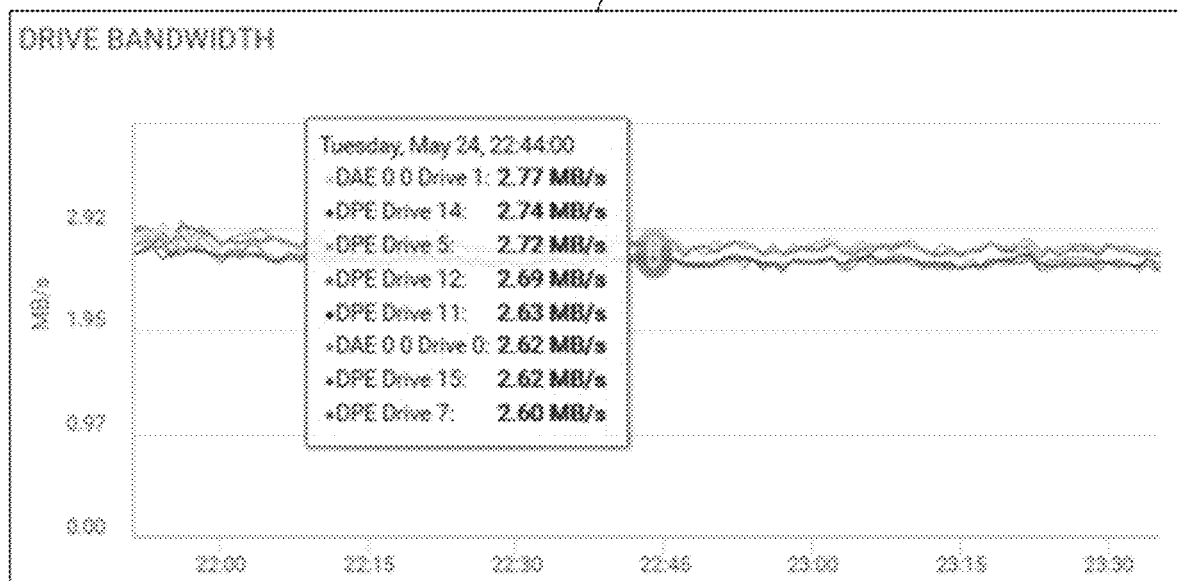
Figure 4E:
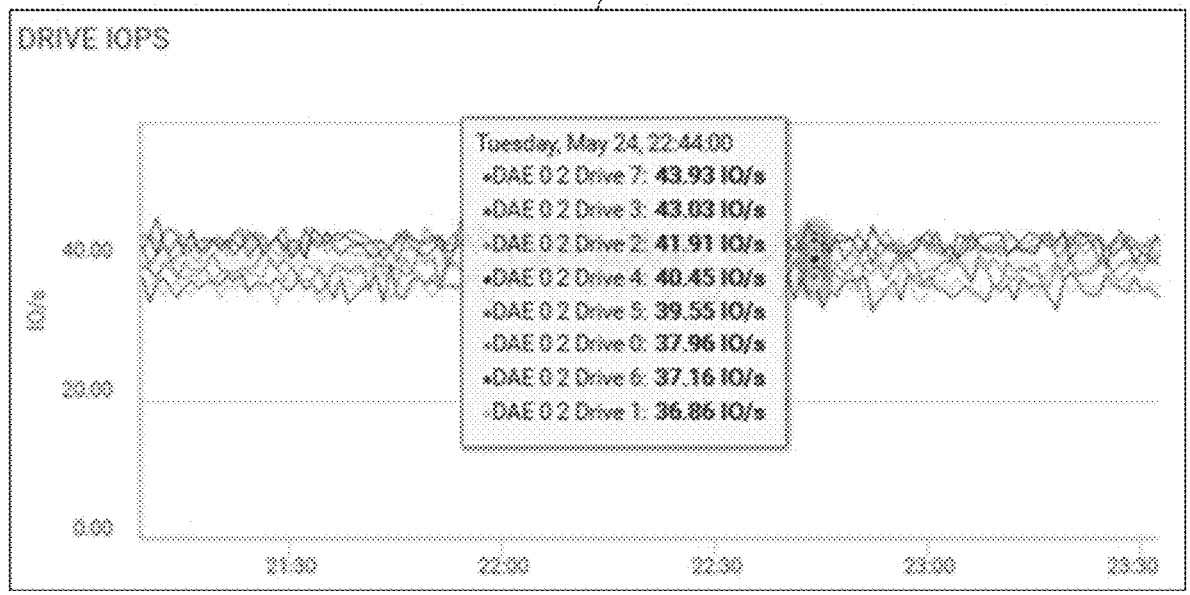
Figure 4F:
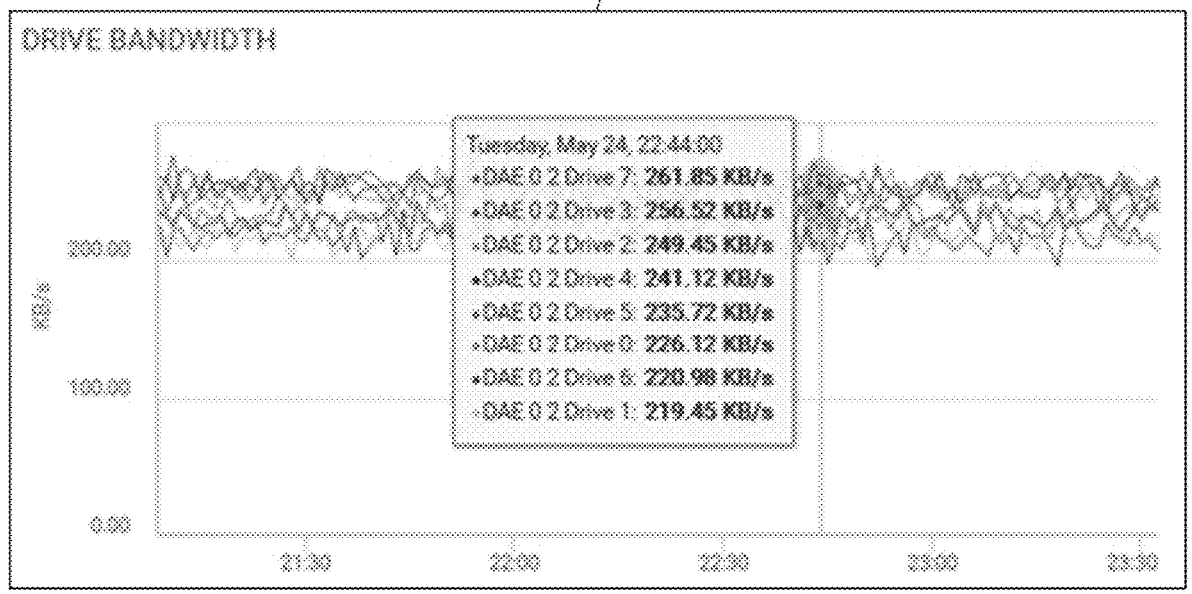
Figure 4G:
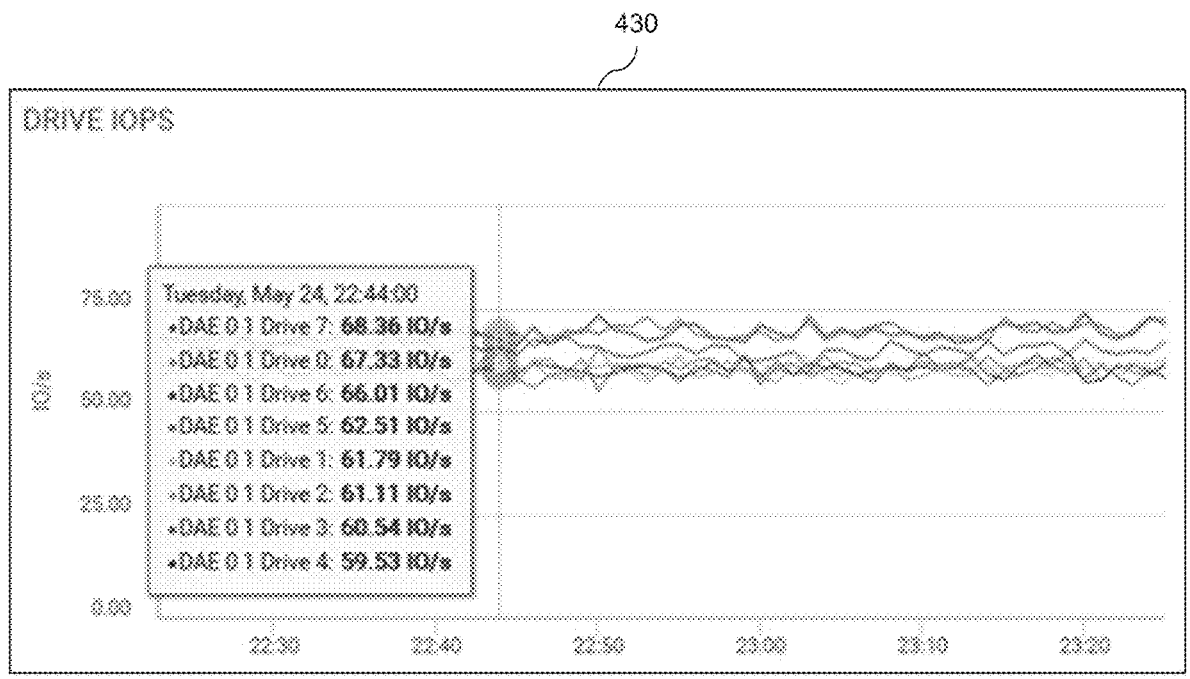
Figure 4H:
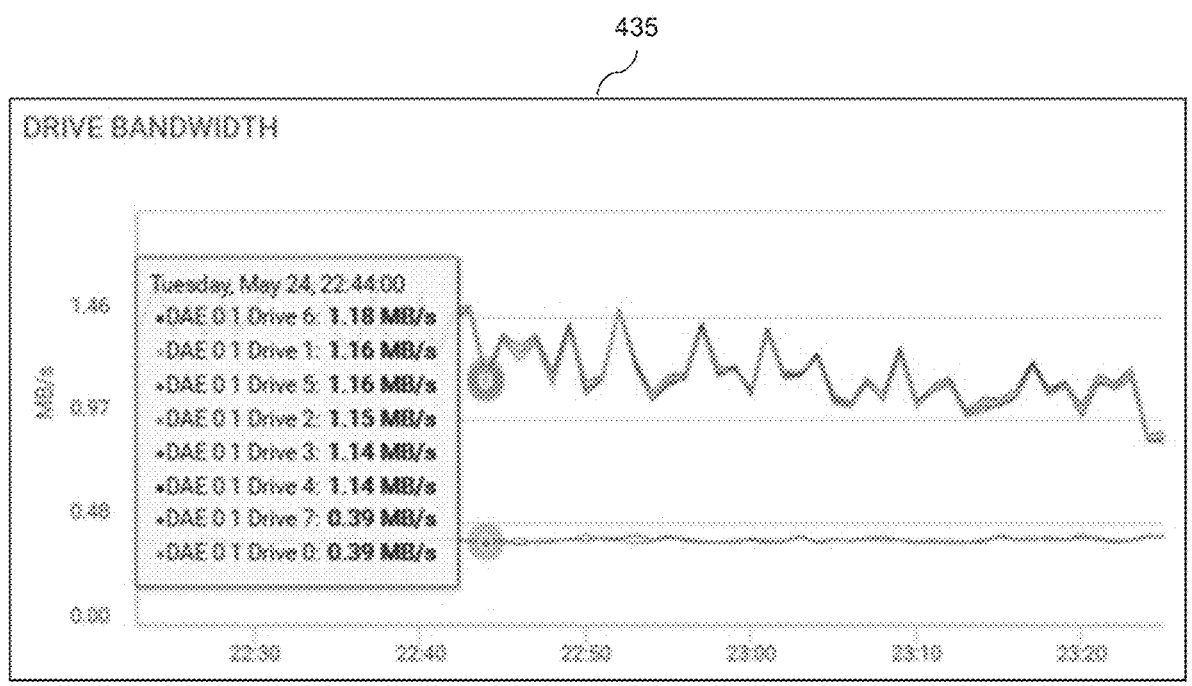
Figure 5A:
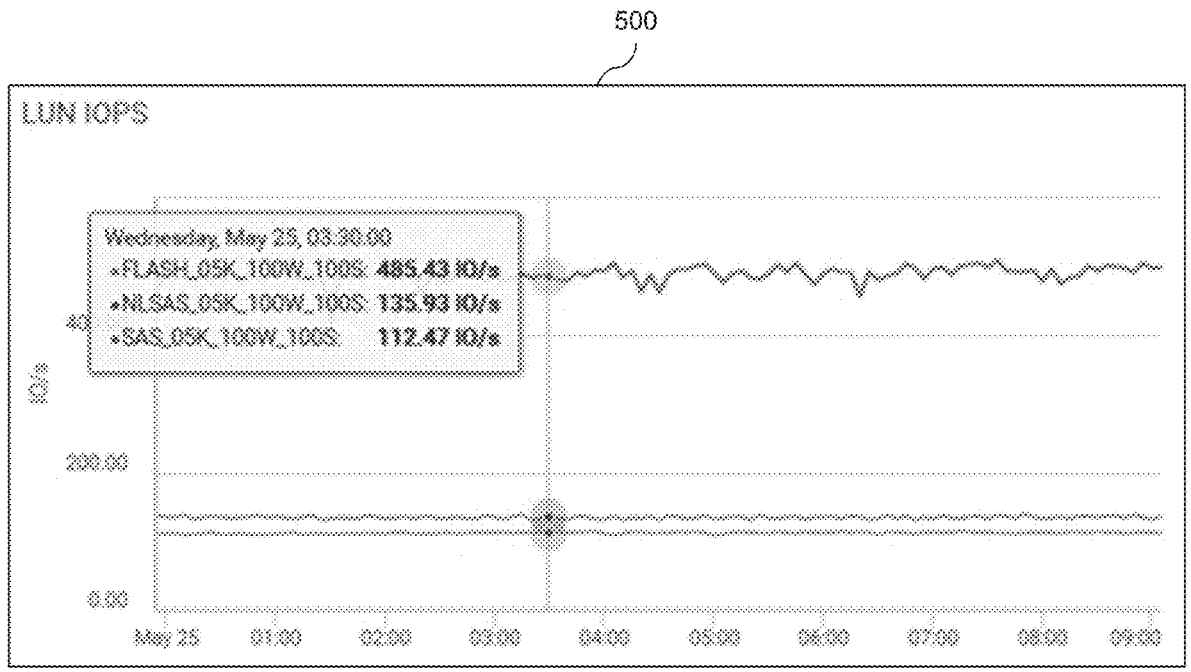
FIGS. 5A-5H show plots of different performance metrics for another input/output pattern on different storage tiers in an illustrative embodiment.
Figure 5B:
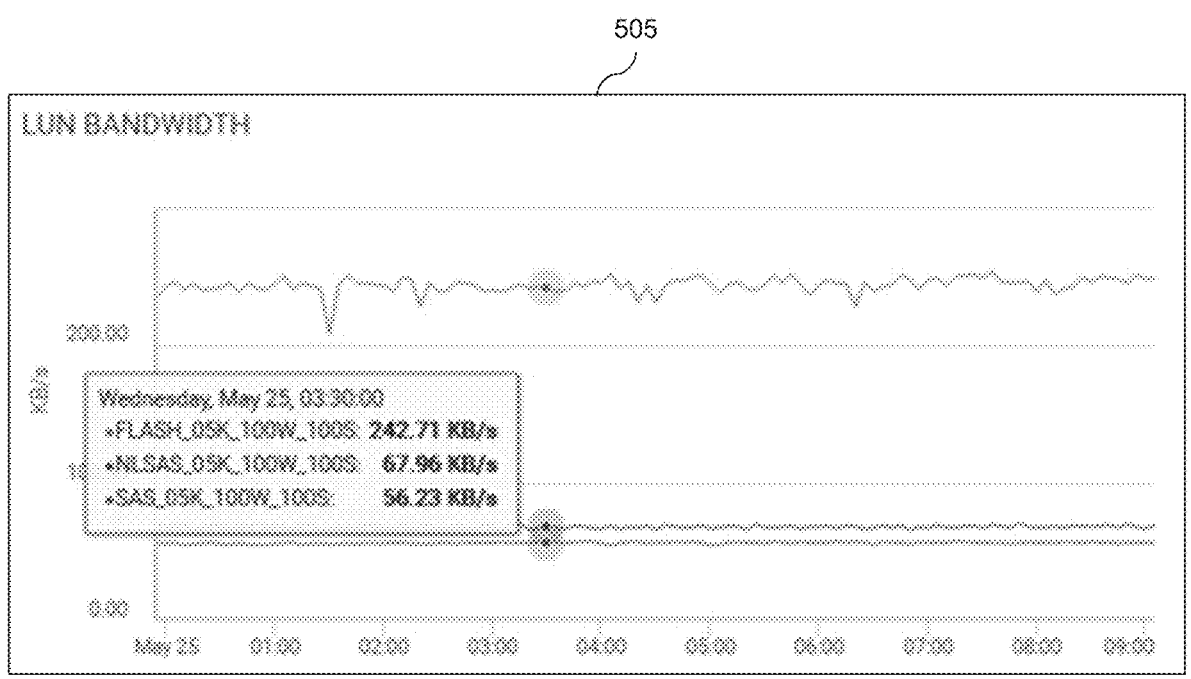
Figure 5C:
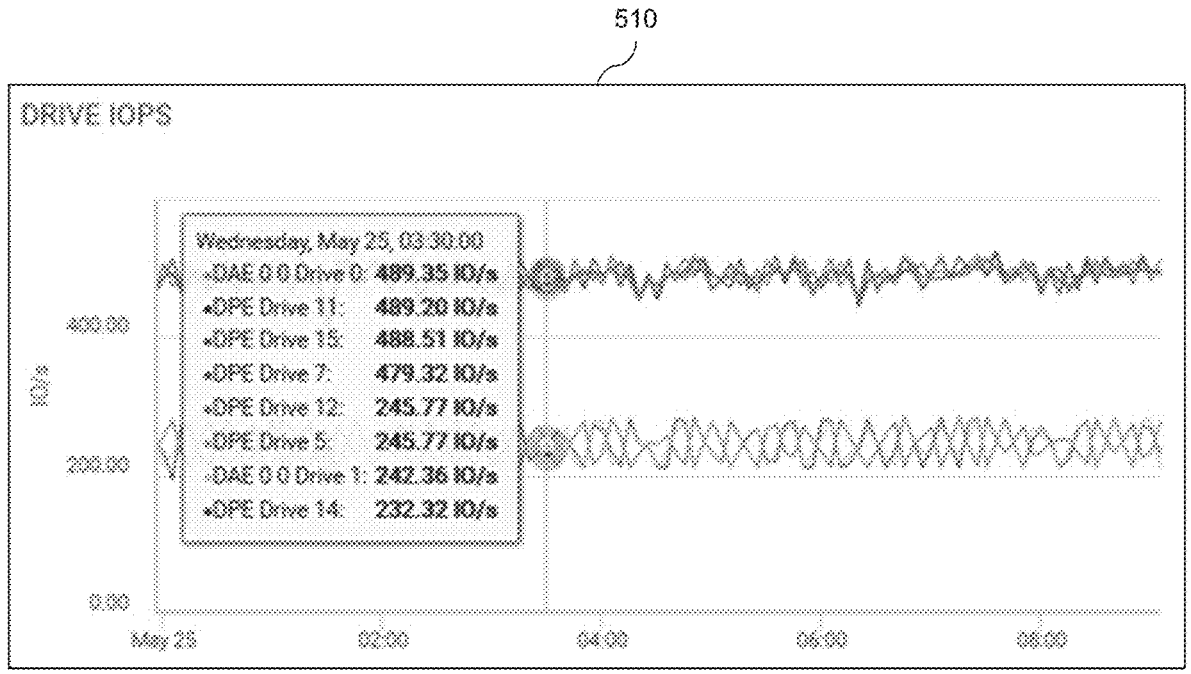
Figure 5D:
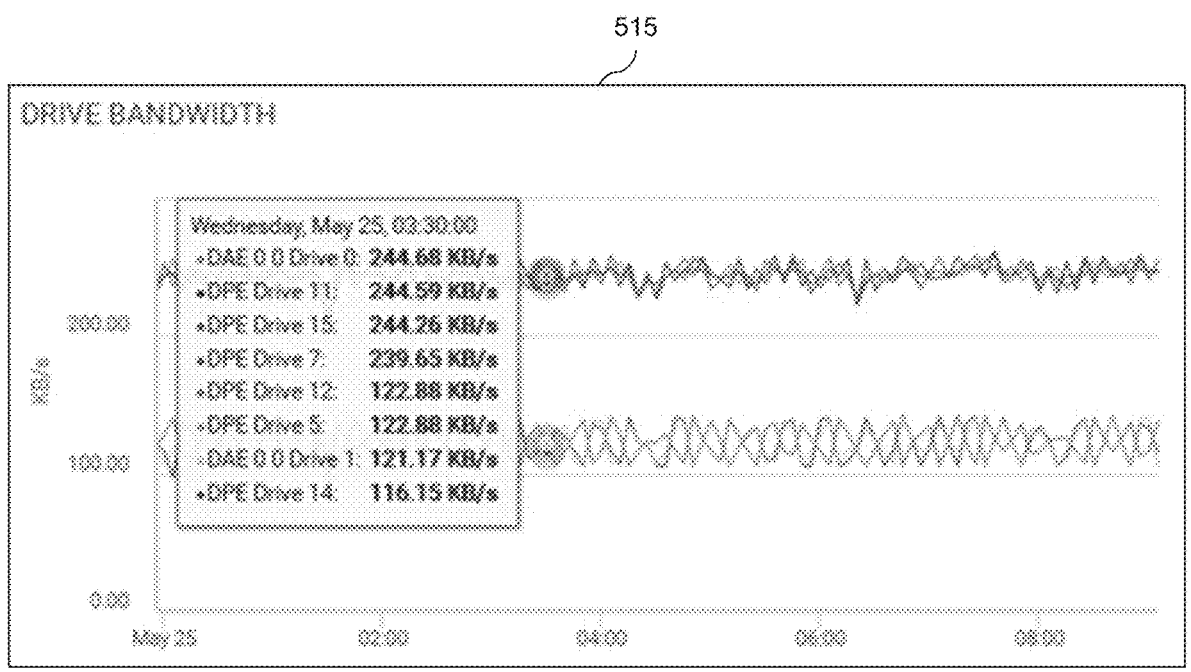
Figure 5E:
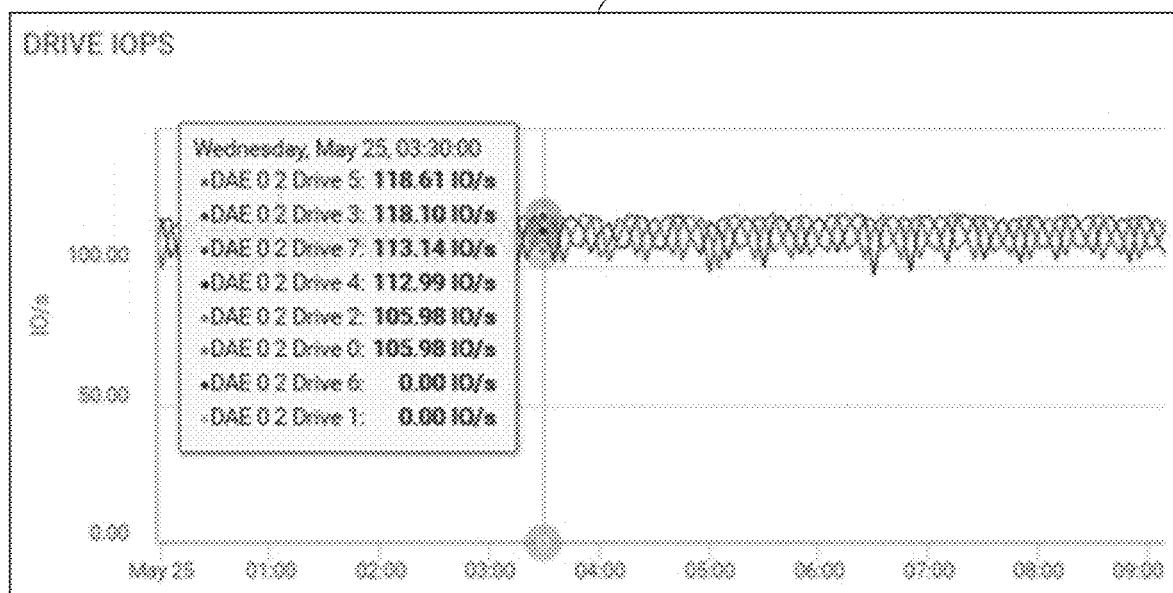
Figure 5F:
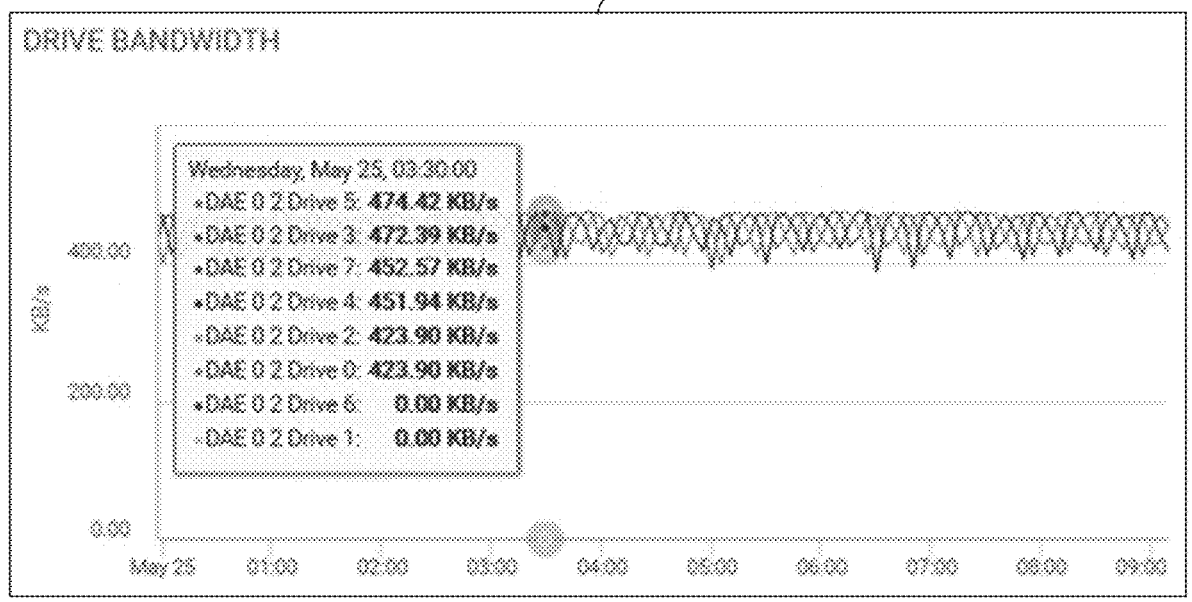
Figure 5G:
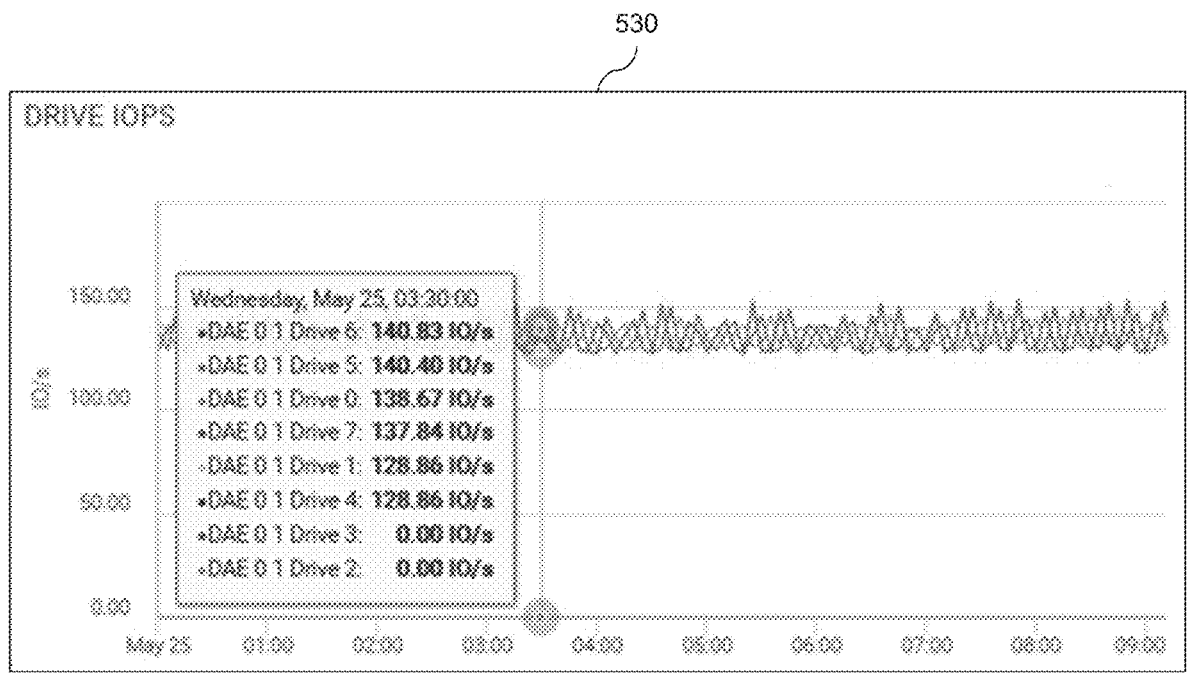
Figure 5H:
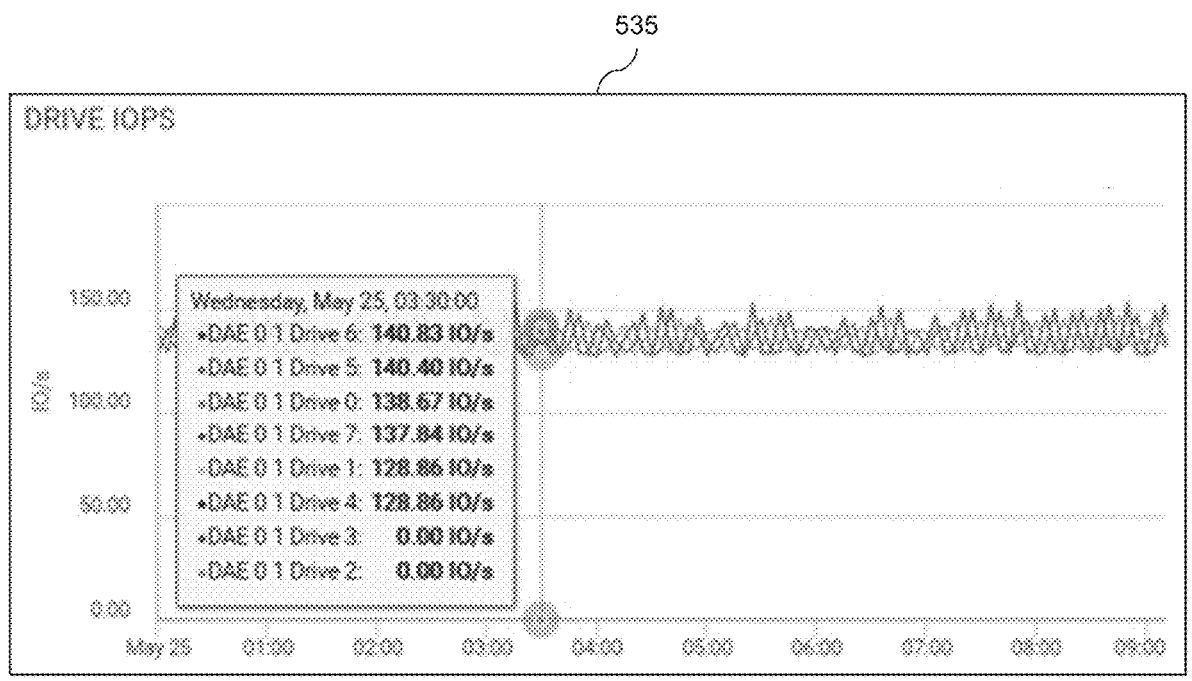
Figure 6A:
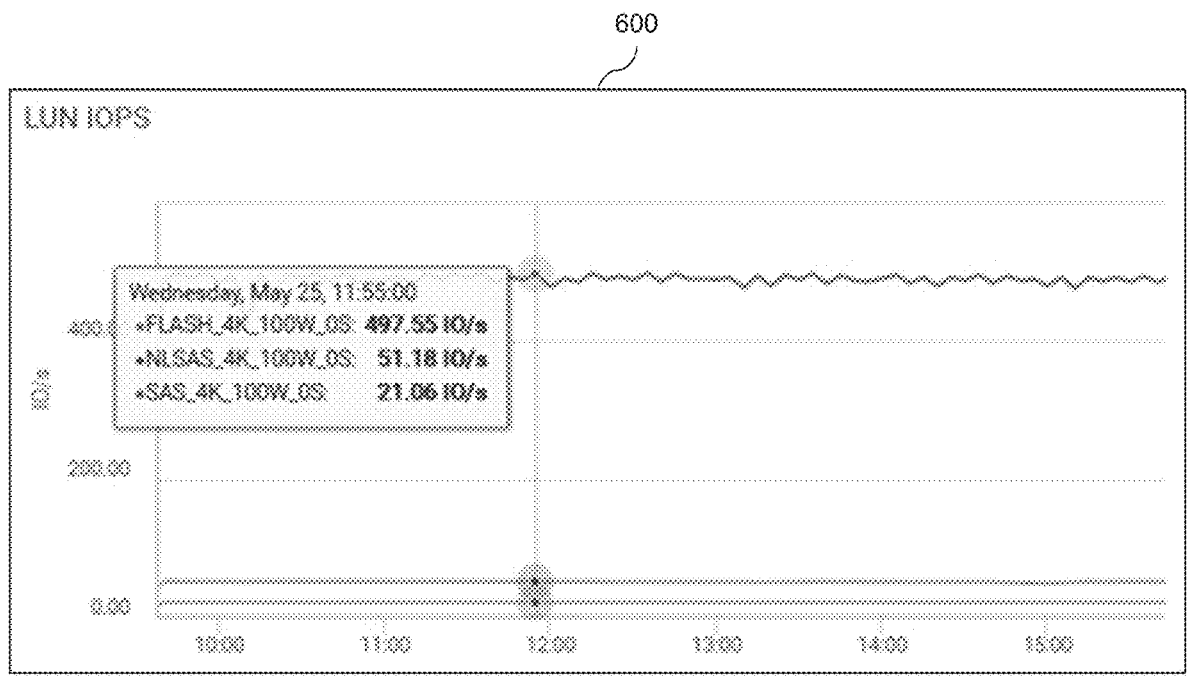
FIGS. 6A-6H show plots of different performance metrics for another input/output pattern on different storage tiers in an illustrative embodiment.
Figure 6B:
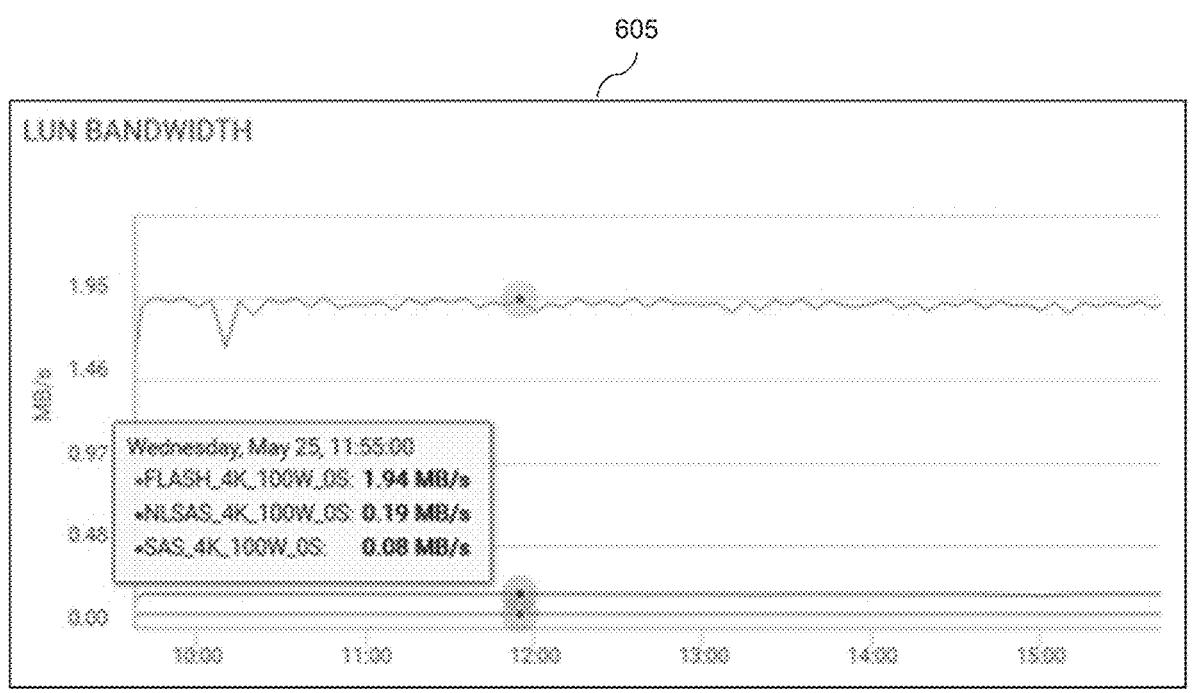
Figure 6C:
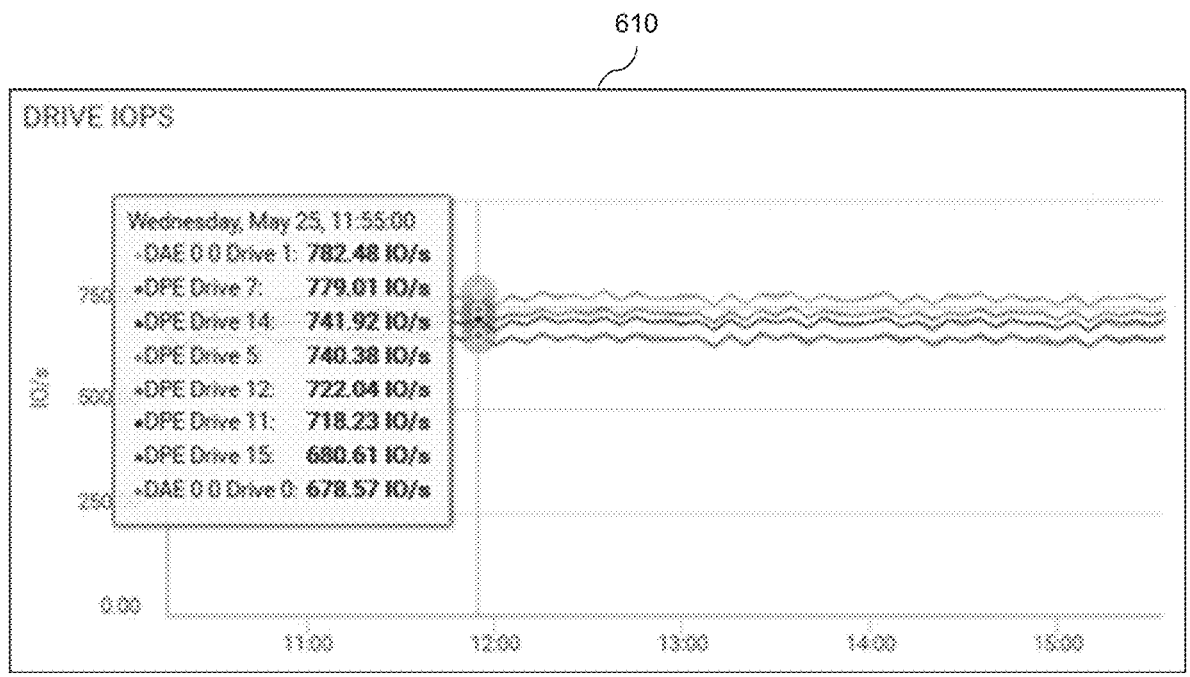
Figure 6D:
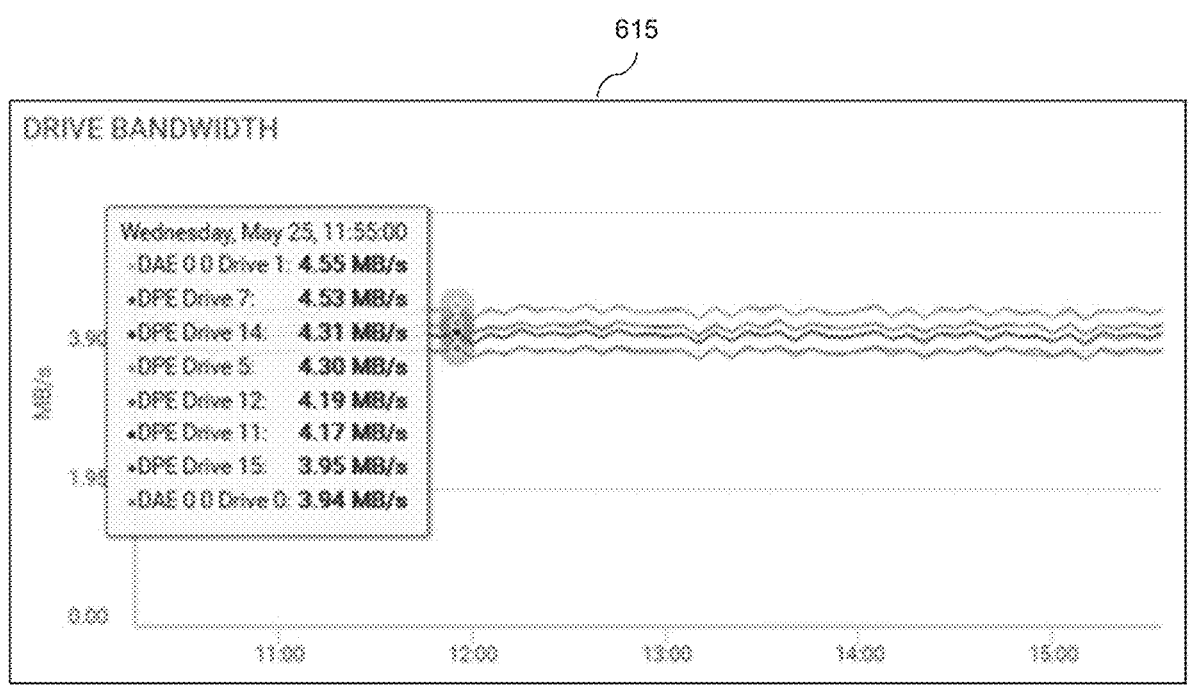
Figure 6E:
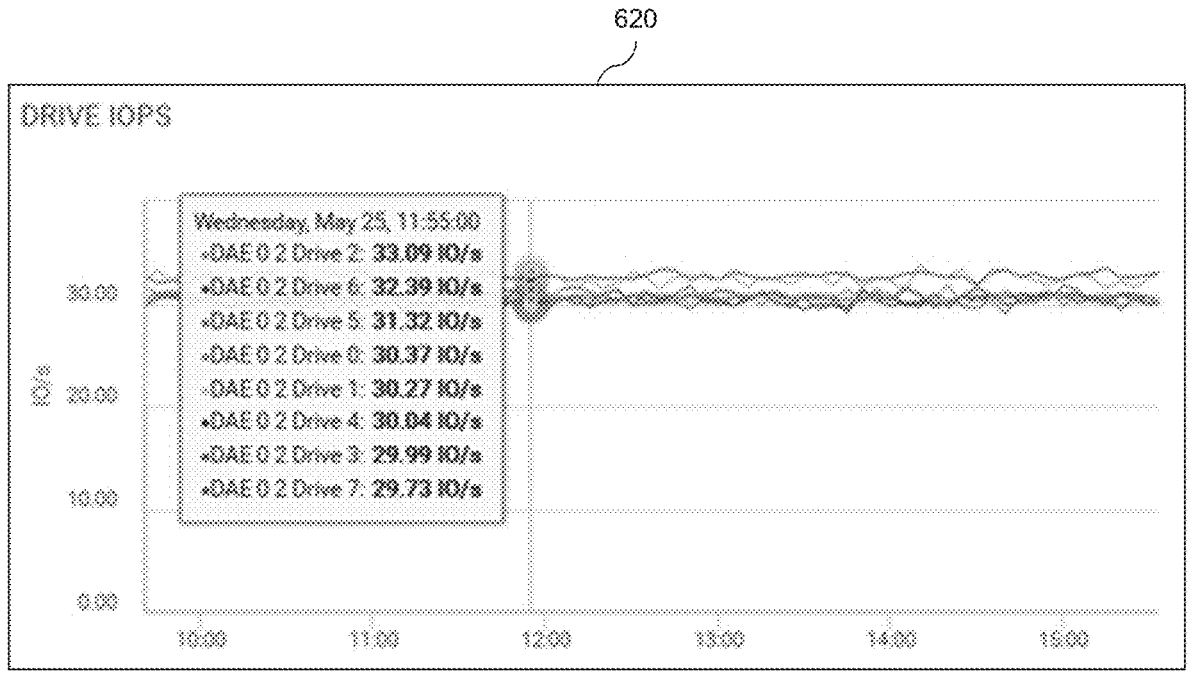
Figure 6F:
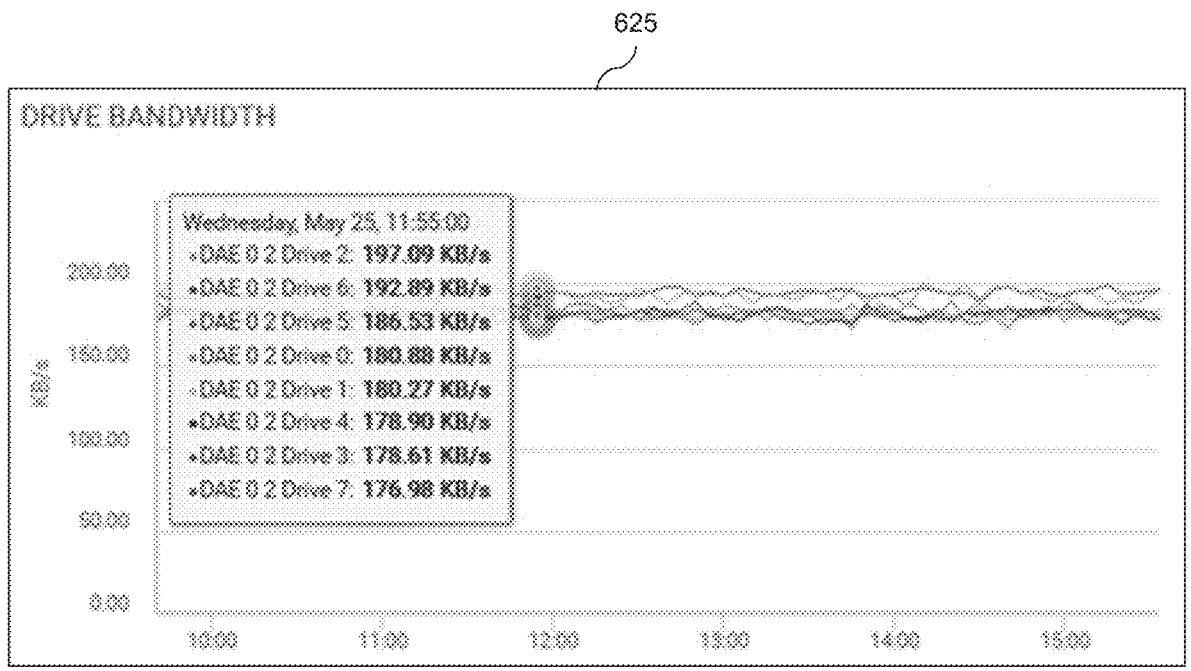
Figure 6G:
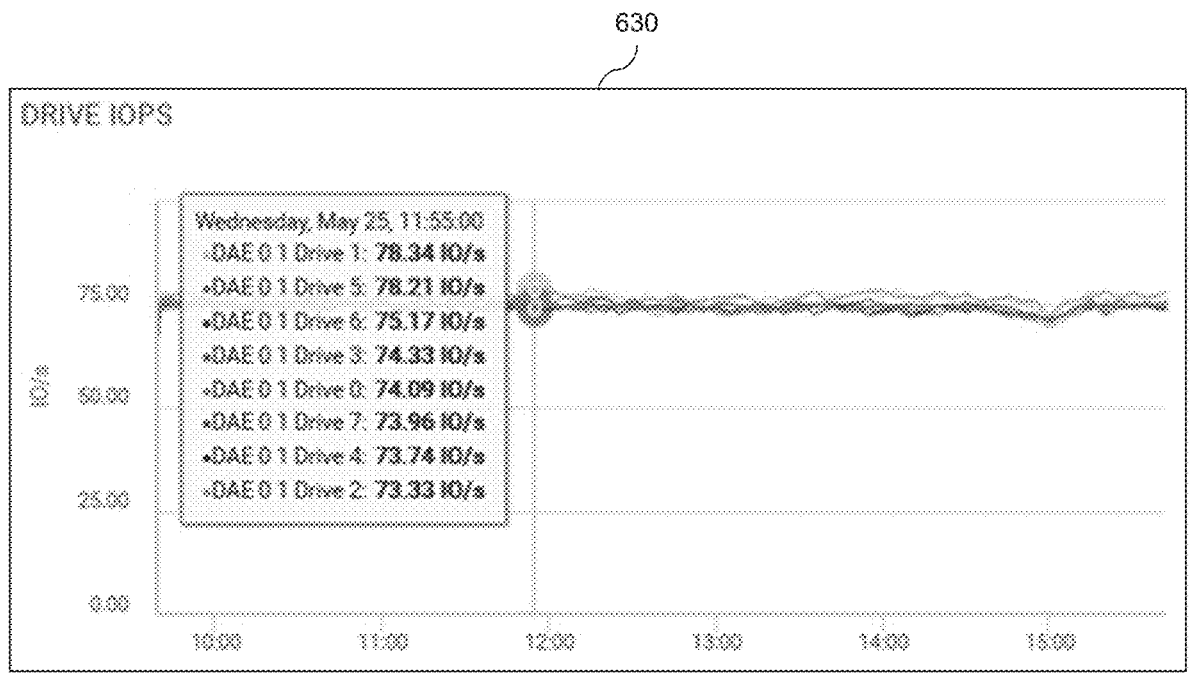
Figure 6H:
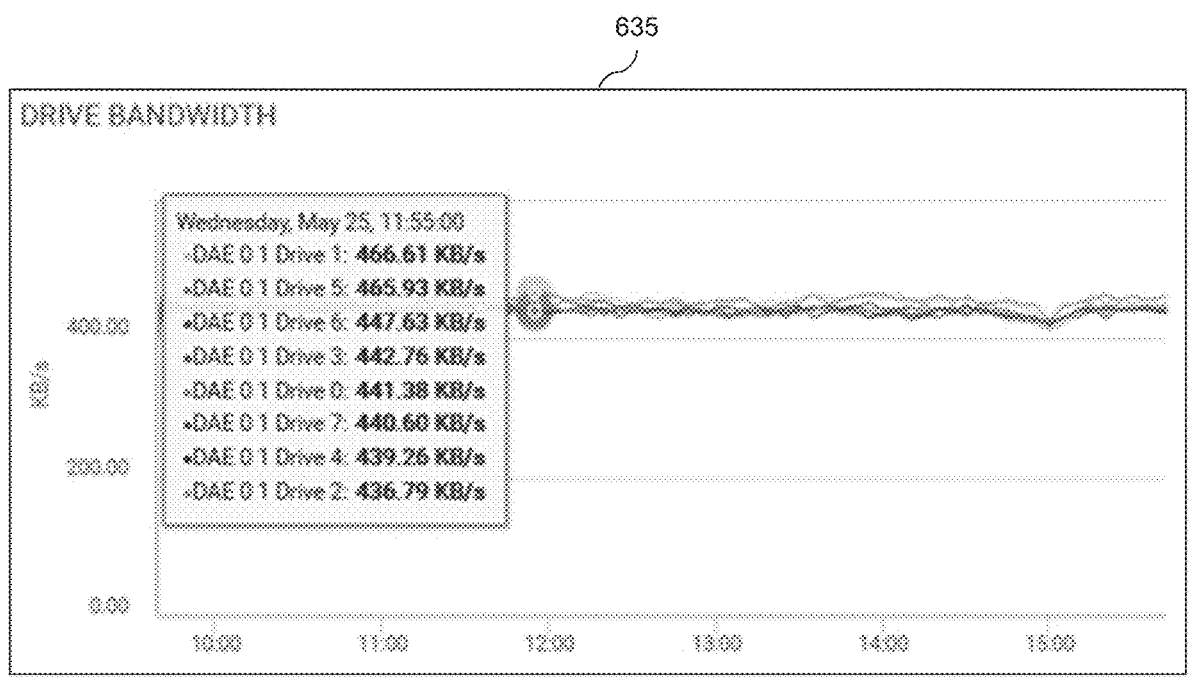
Figure 7A:
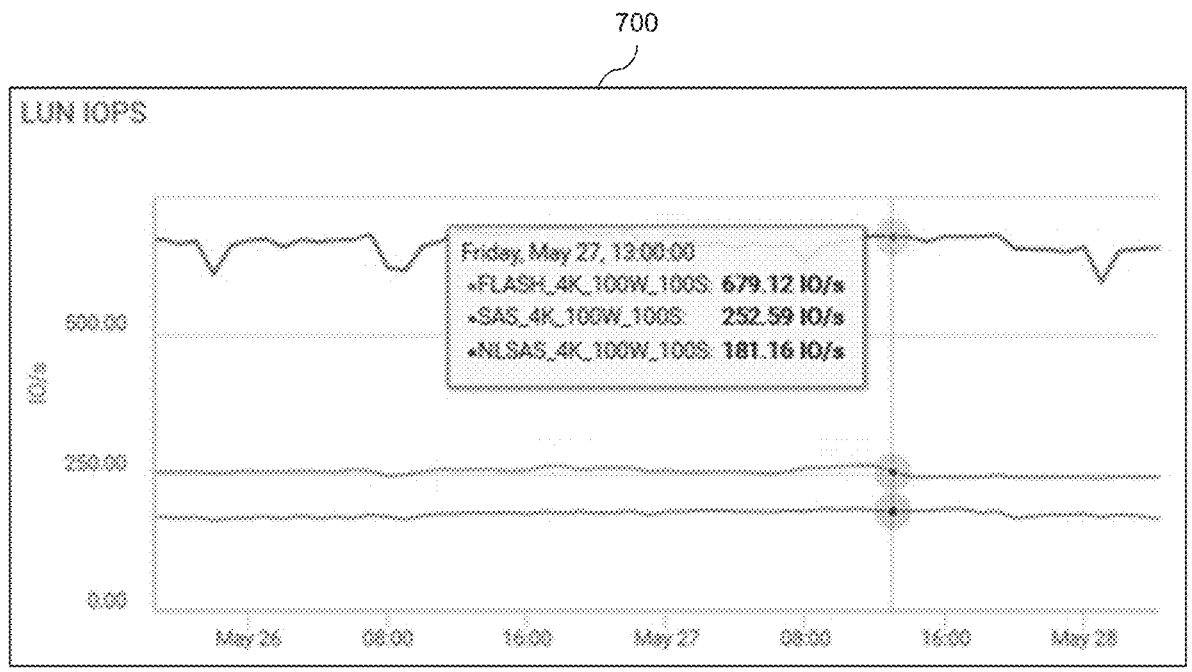
FIGS. 7A-7H show plots of different performance metrics for another input/output pattern on different storage tiers in an illustrative embodiment.
Figure 7B:
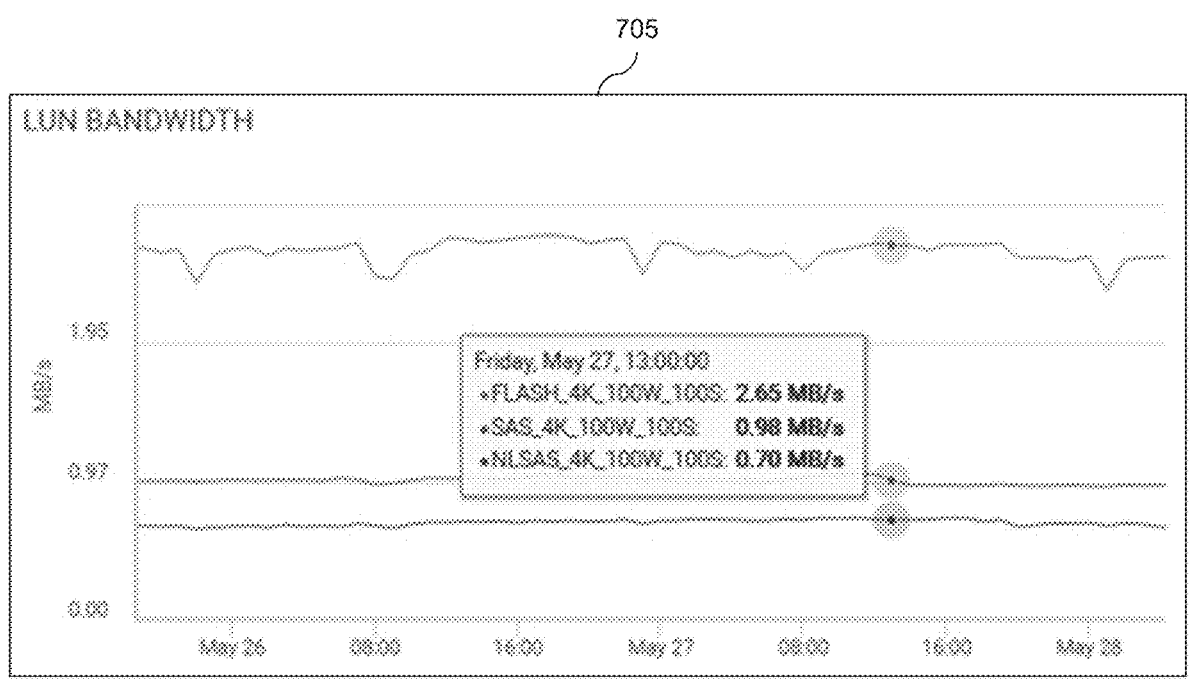
Figure 7C:
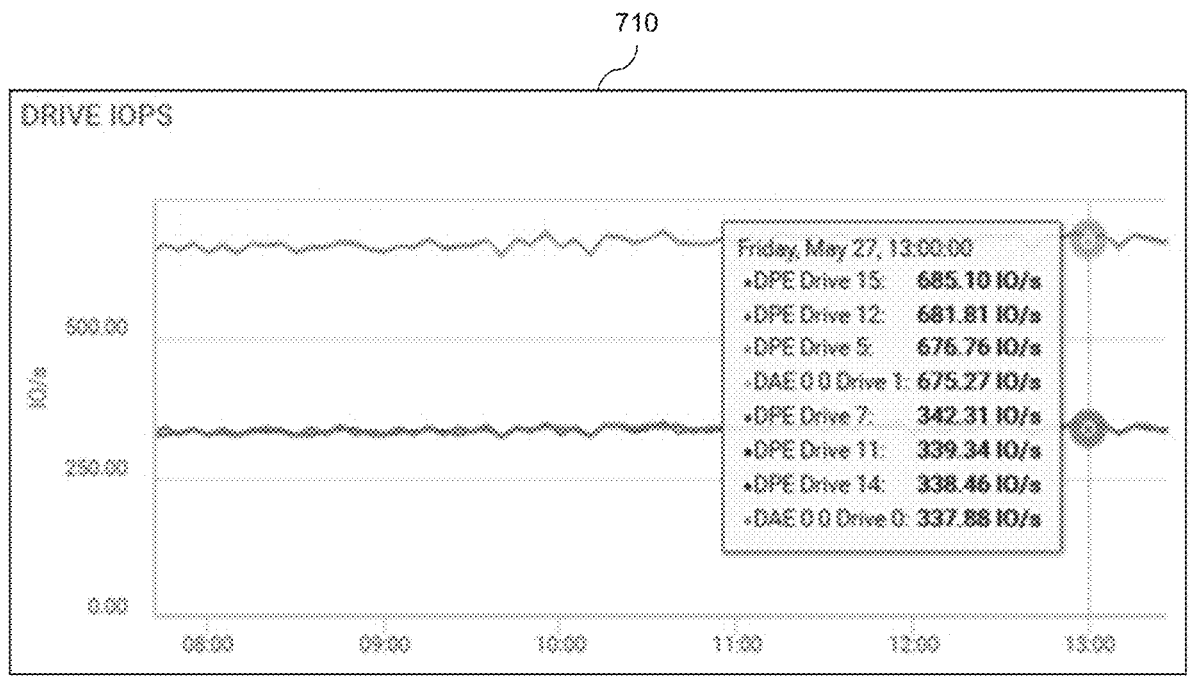
Figure 7D:
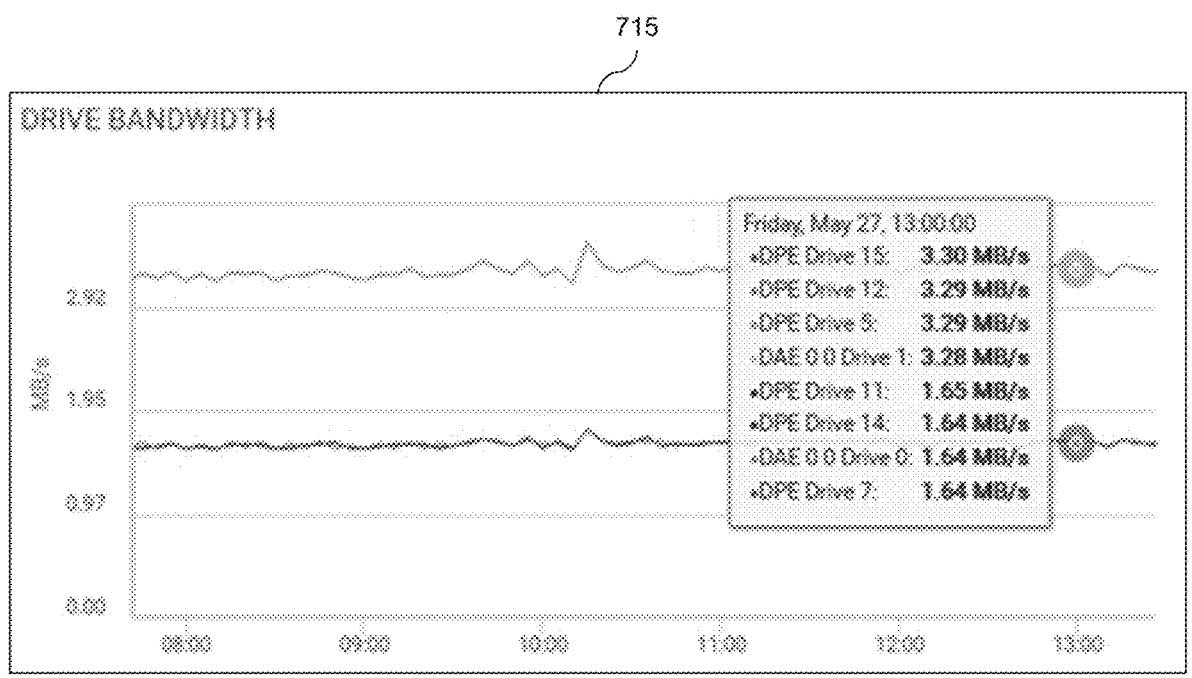
Figure 7E:
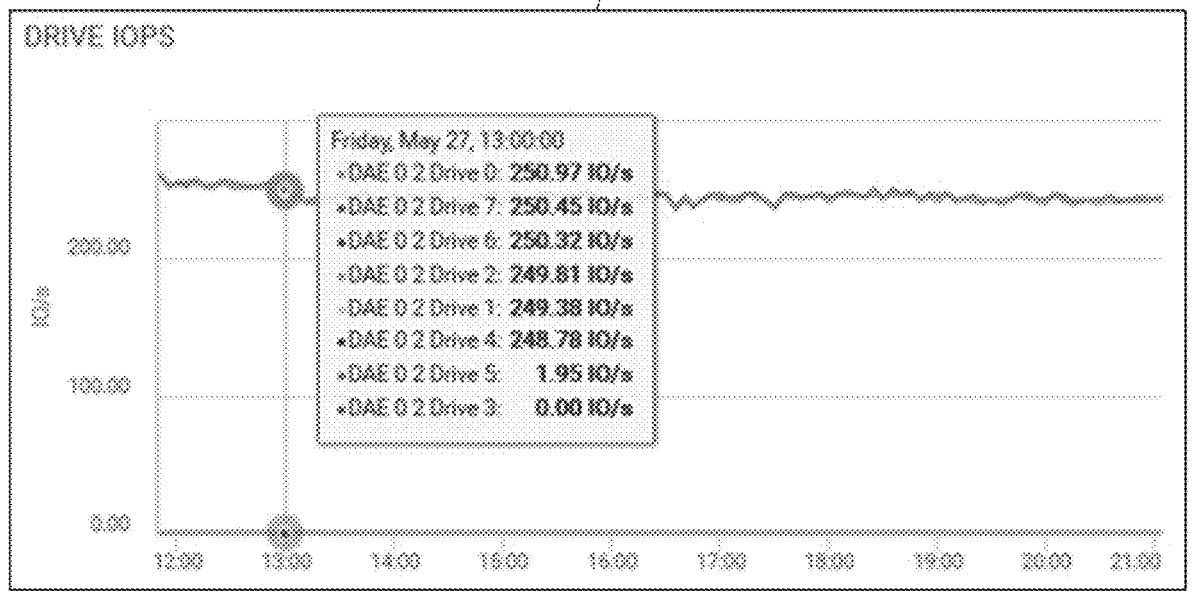
Figure 7F:
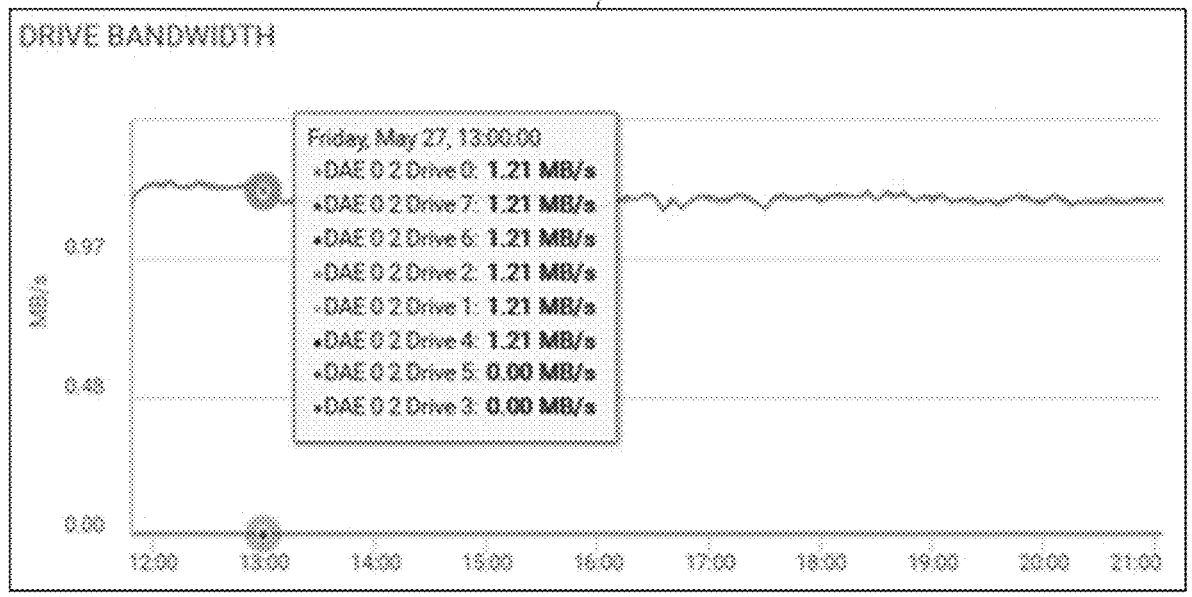
Figure 7G:
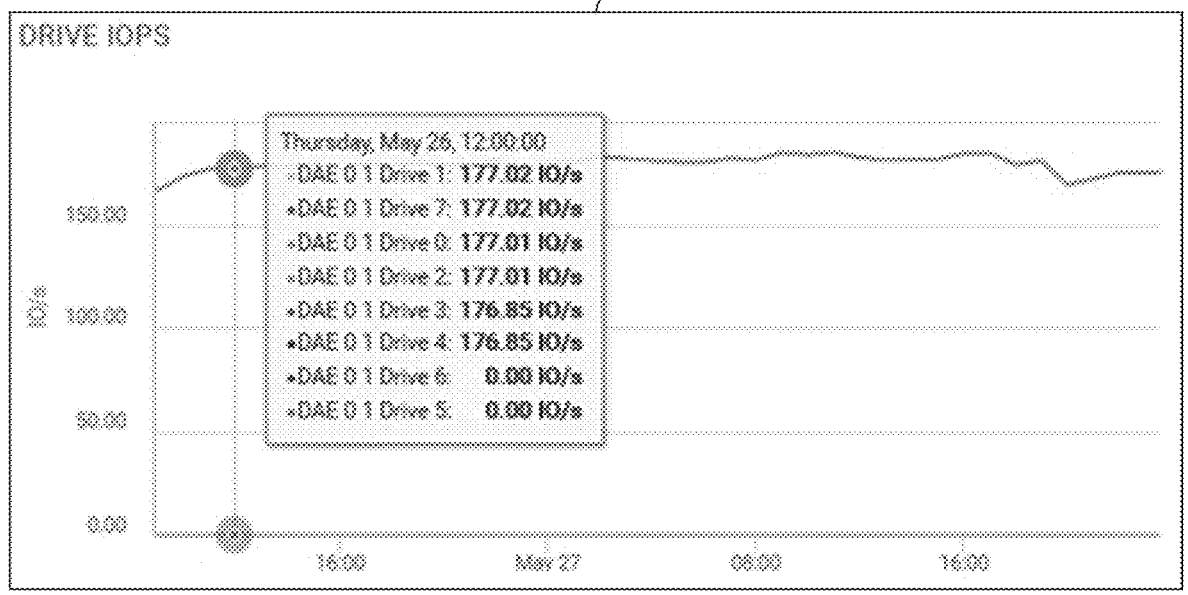
Figure 7H:
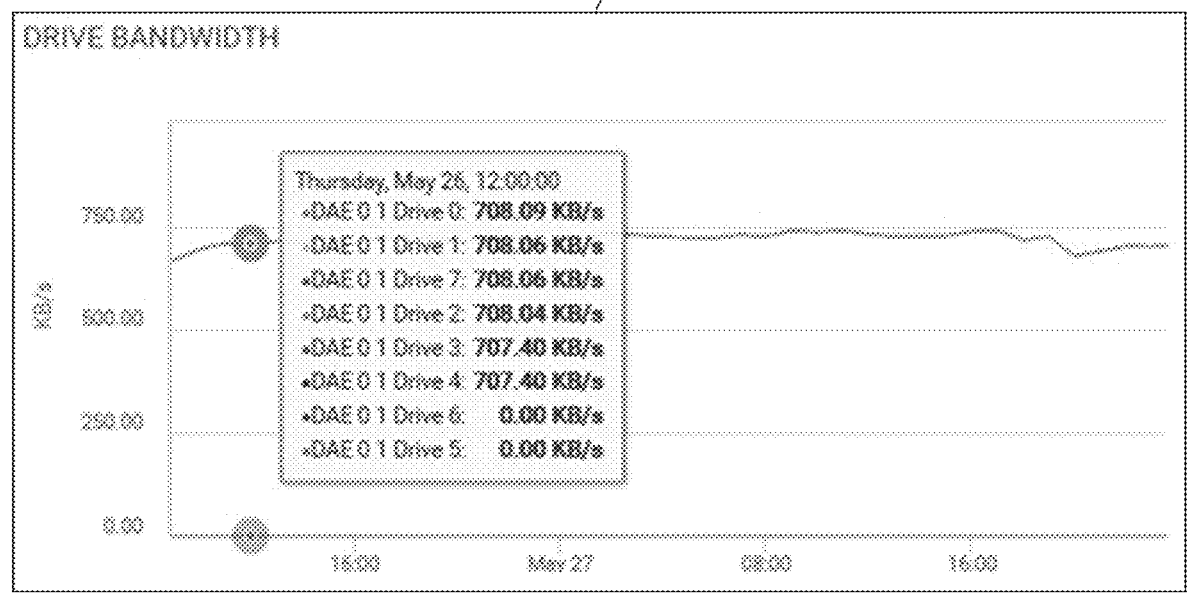
Figure 8A:
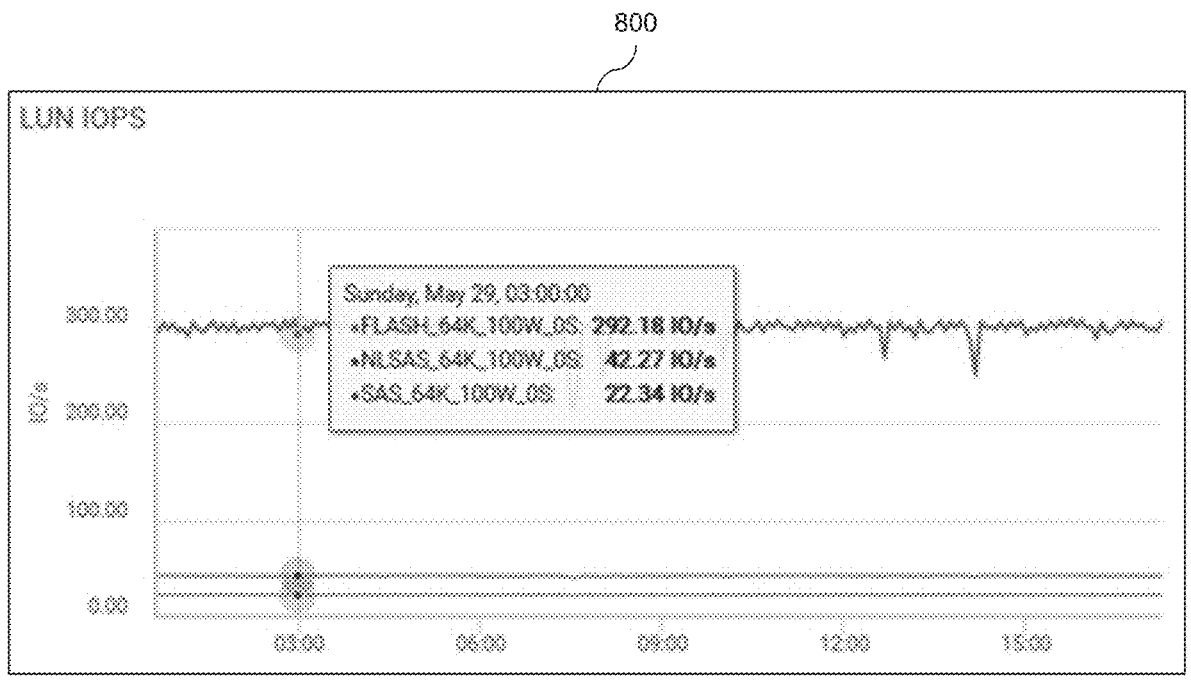
FIGS. 8A-8H show plots of different performance metrics for another input/output pattern on different storage tiers in an illustrative embodiment.
Figure 8B:
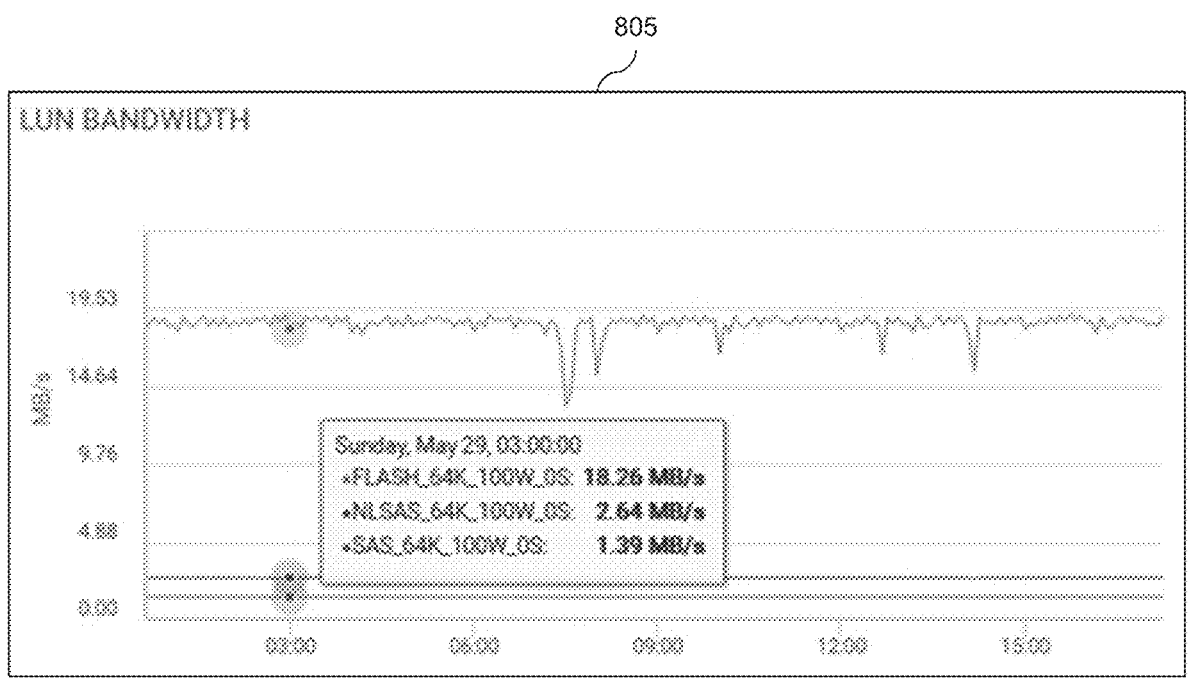
Figure 8C:
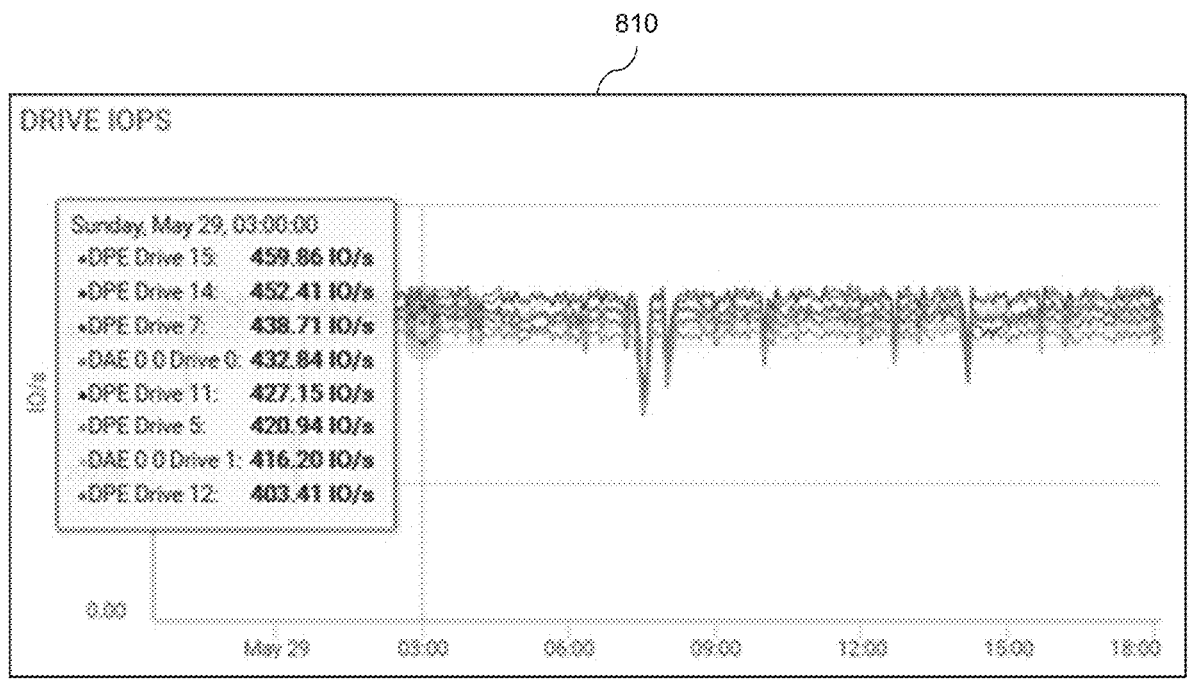
Figure 8D:
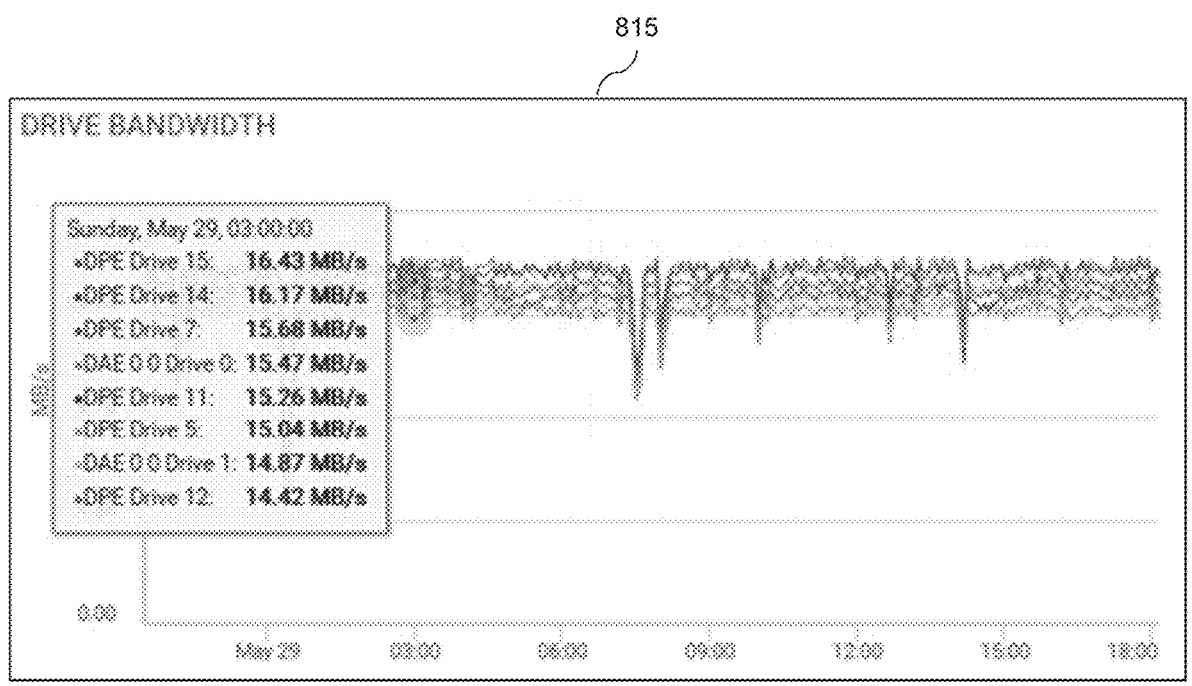
Figure 8E:
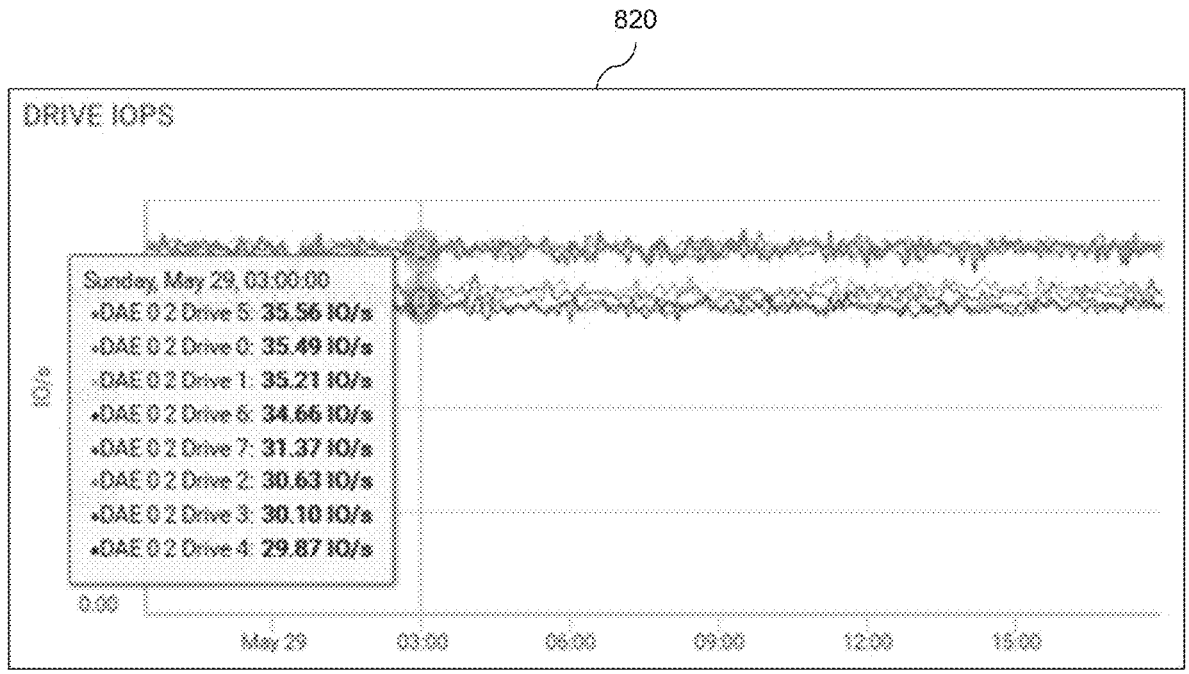
Figure 8F:
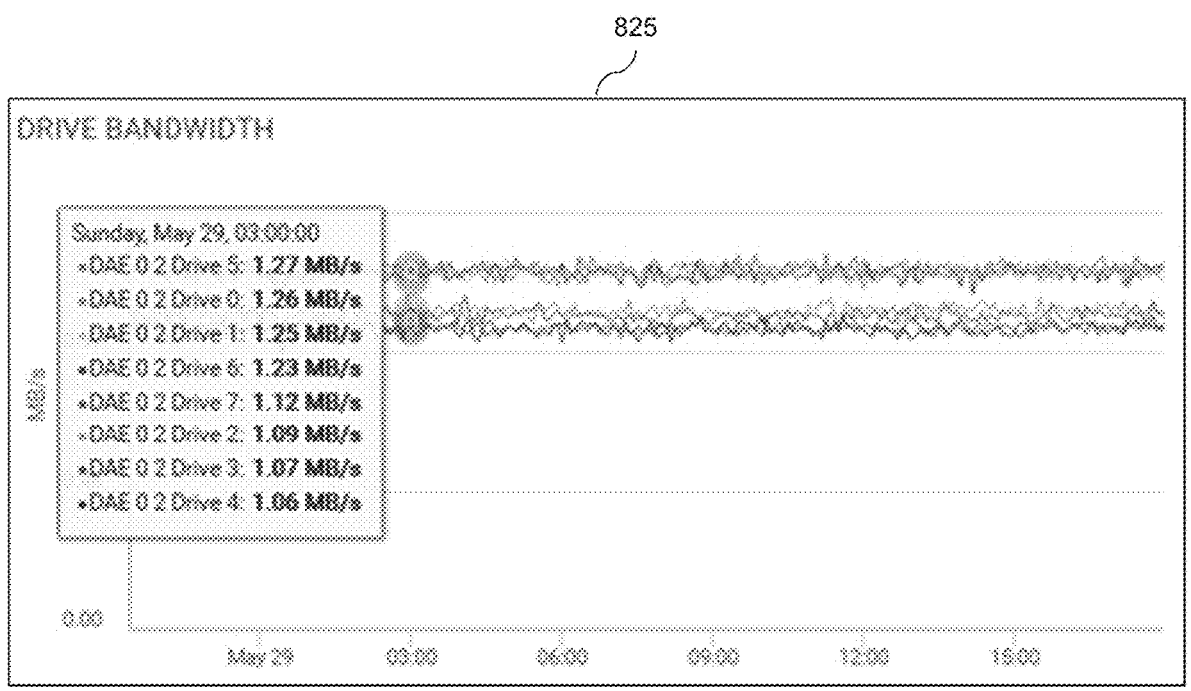
Figure 8G:
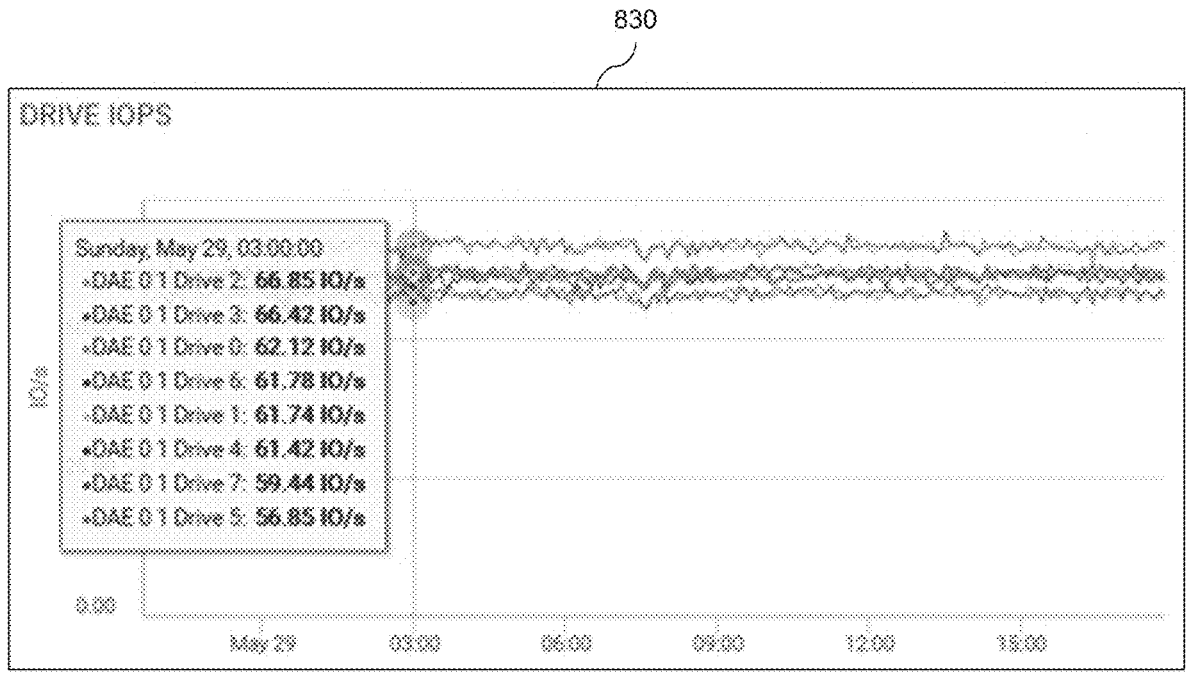
Figure 8H:
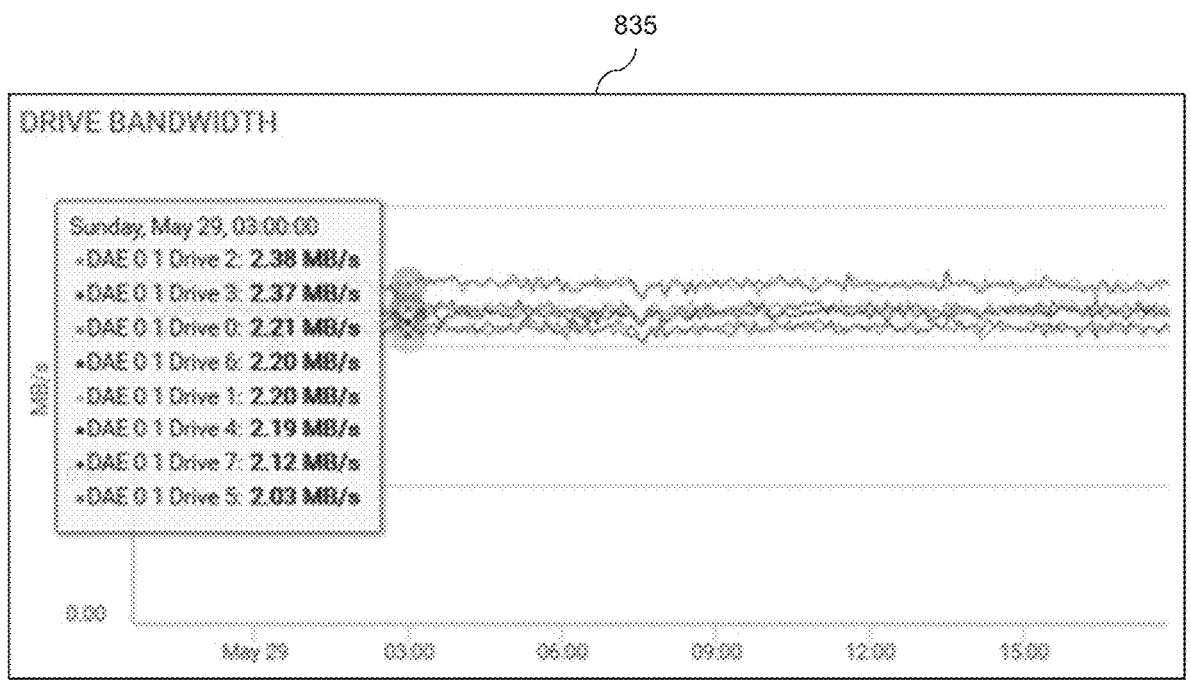
Figure 9A:
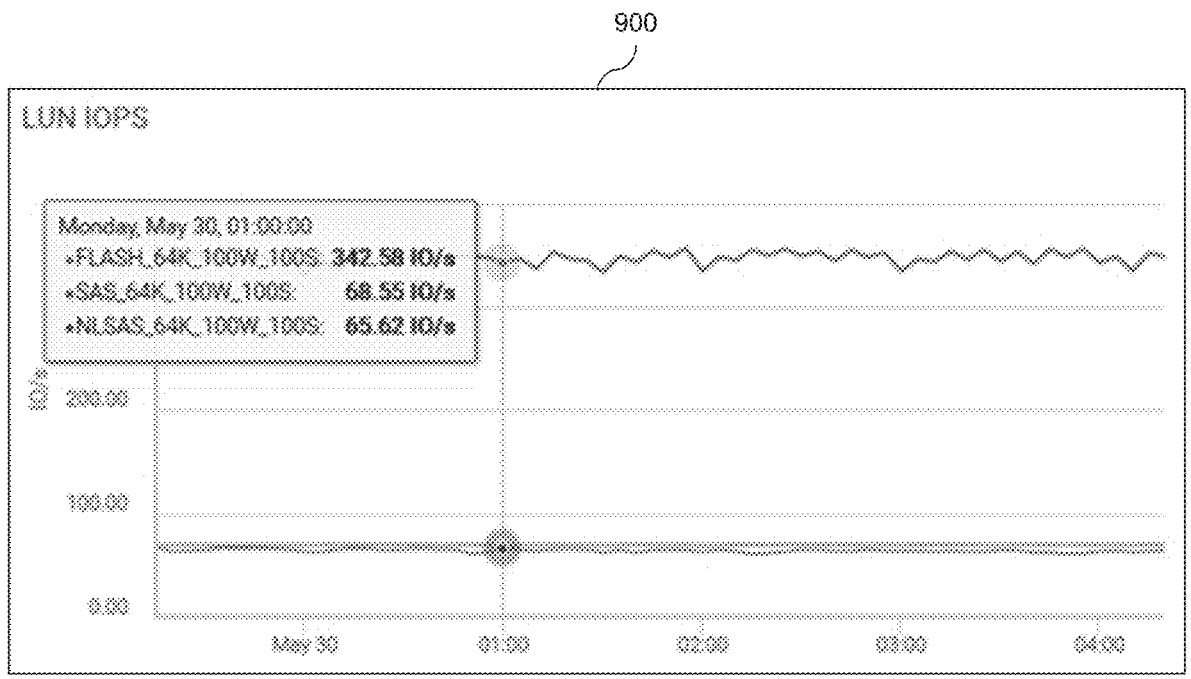
FIGS. 9A-9H show plots of different performance metrics for another input/output pattern on different storage tiers in an illustrative embodiment.
Figure 9B:
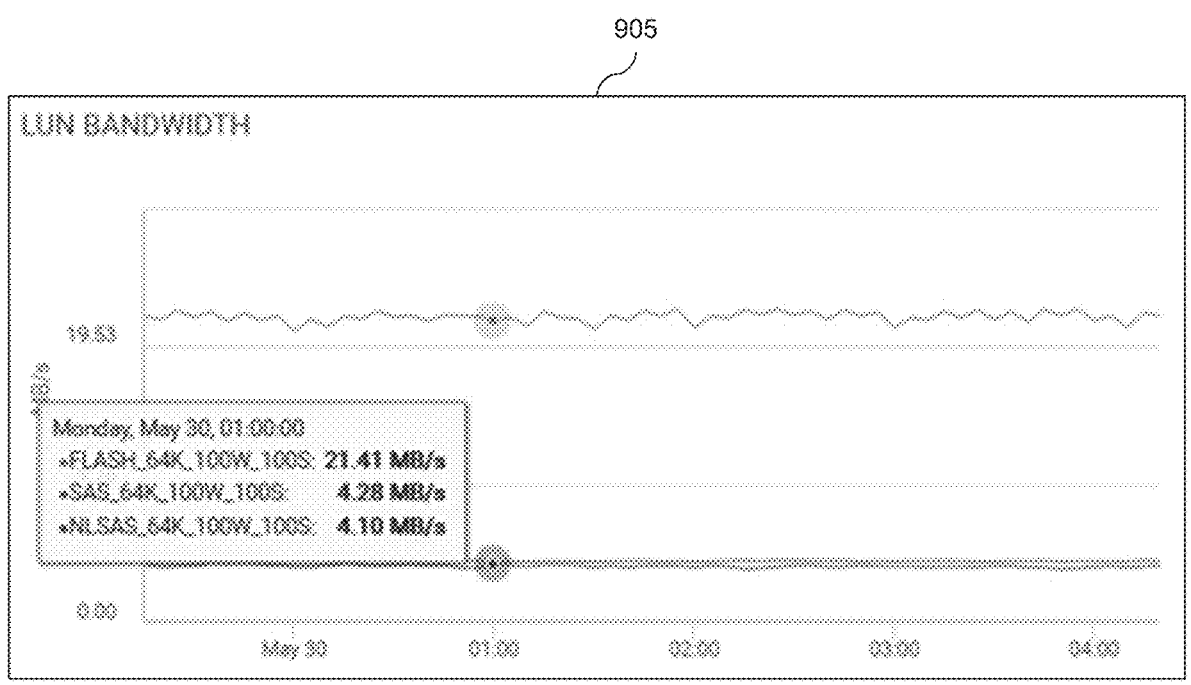
Figure 9C:
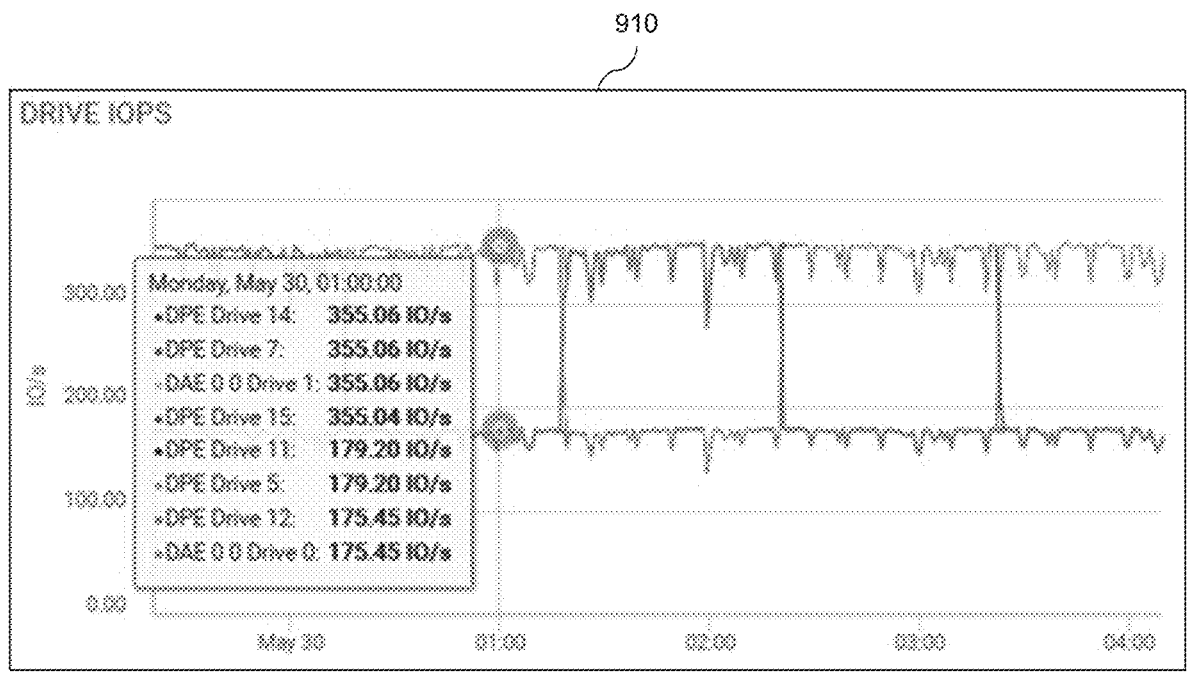
Figure 9D:
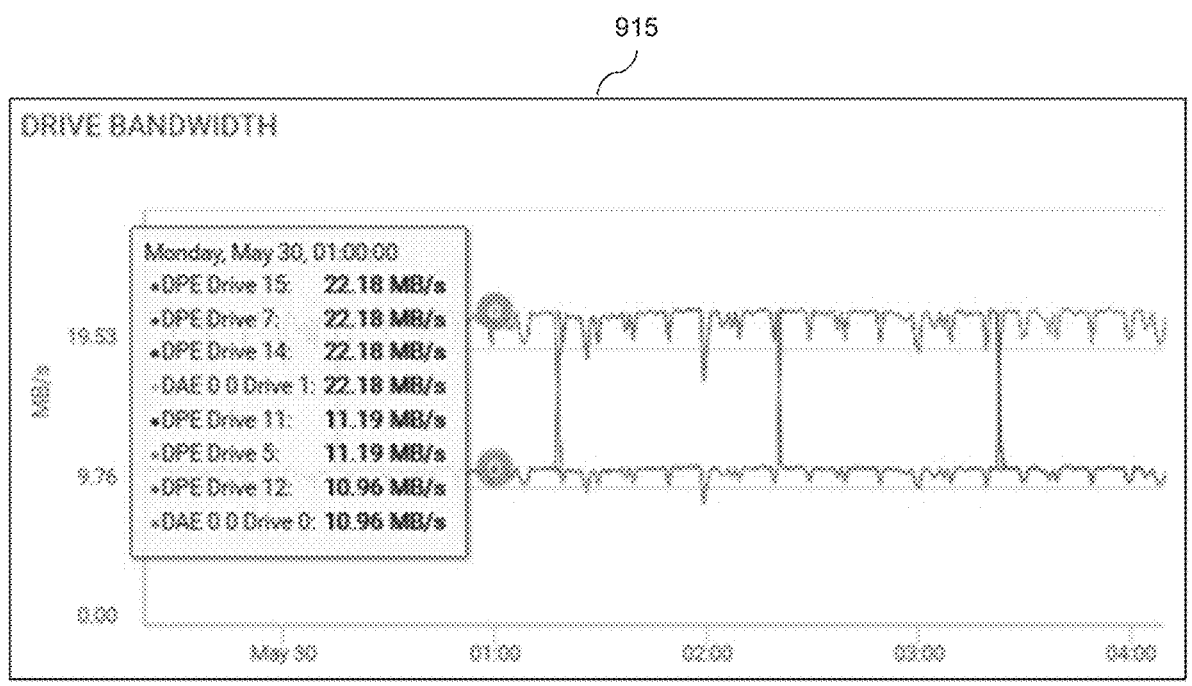
Figure 9E:
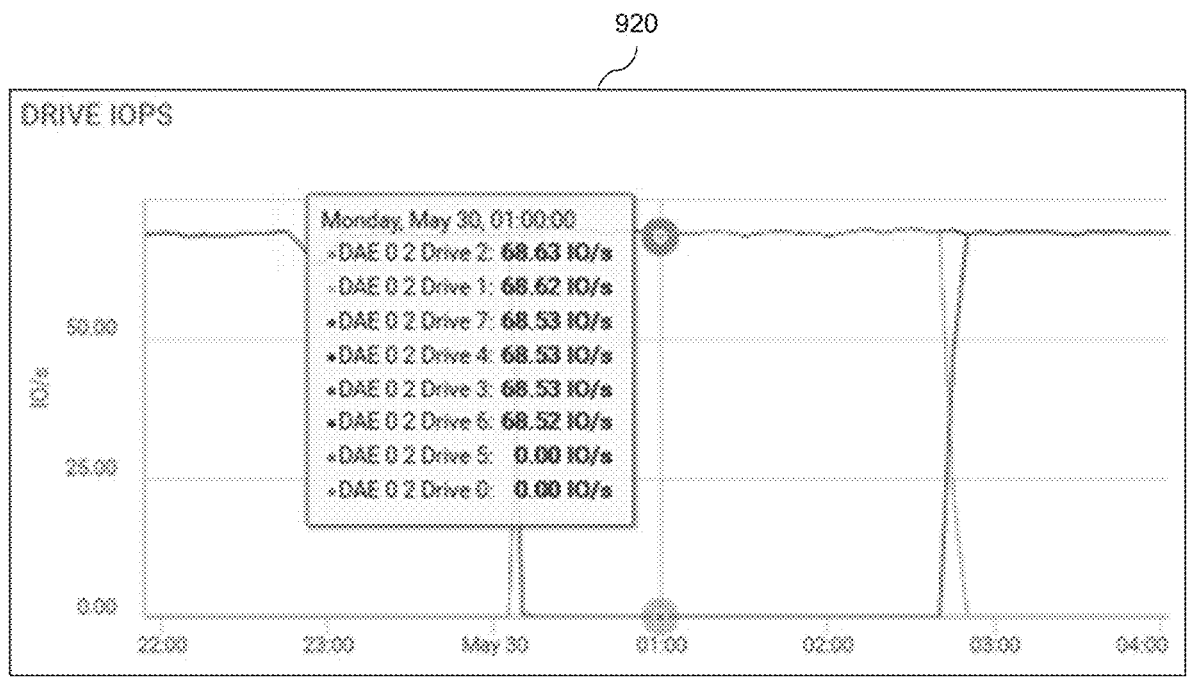
Figure 9F:
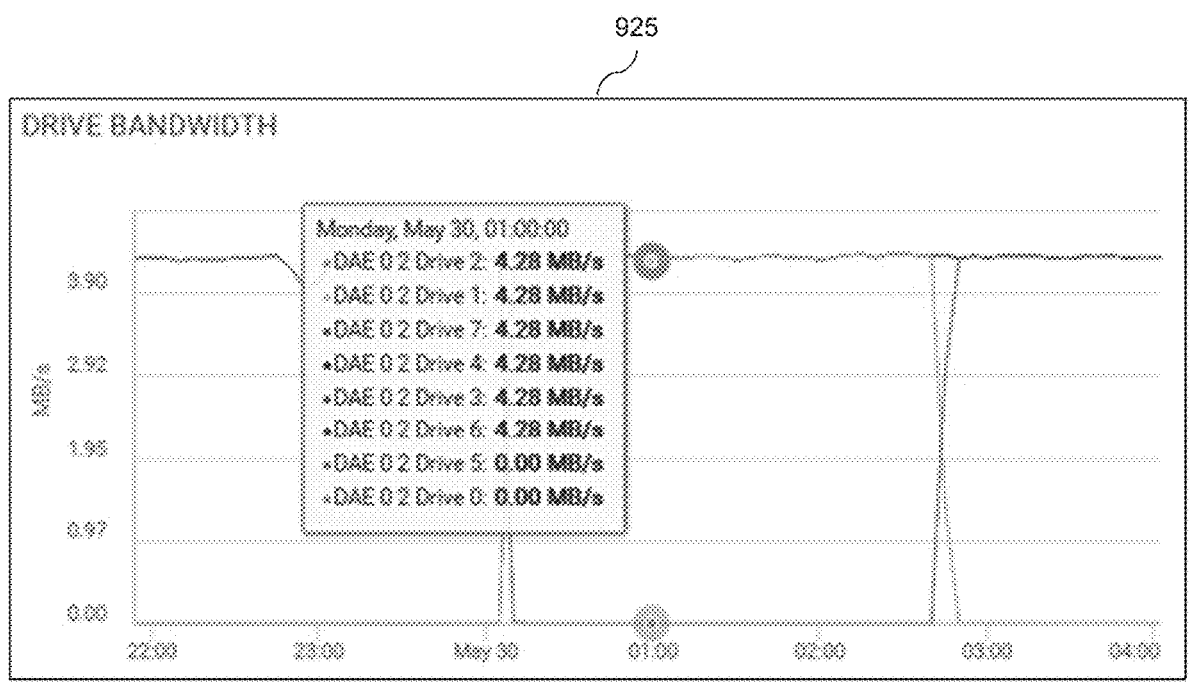
Figure 9G:
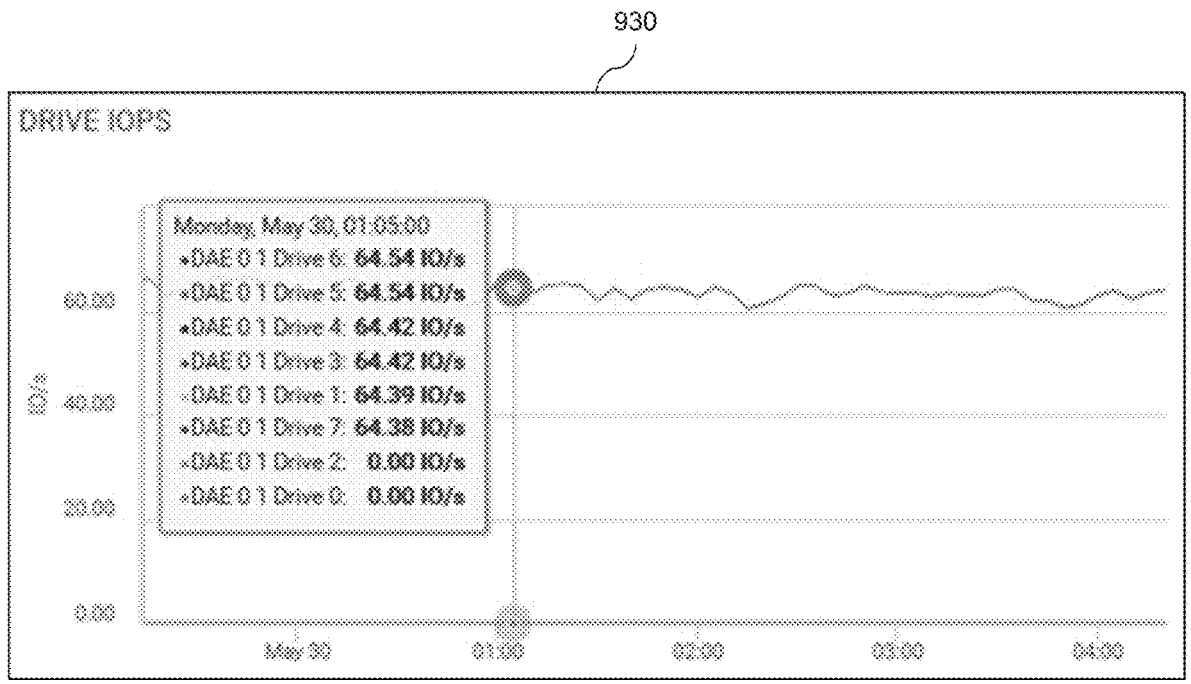
Figure 9H:
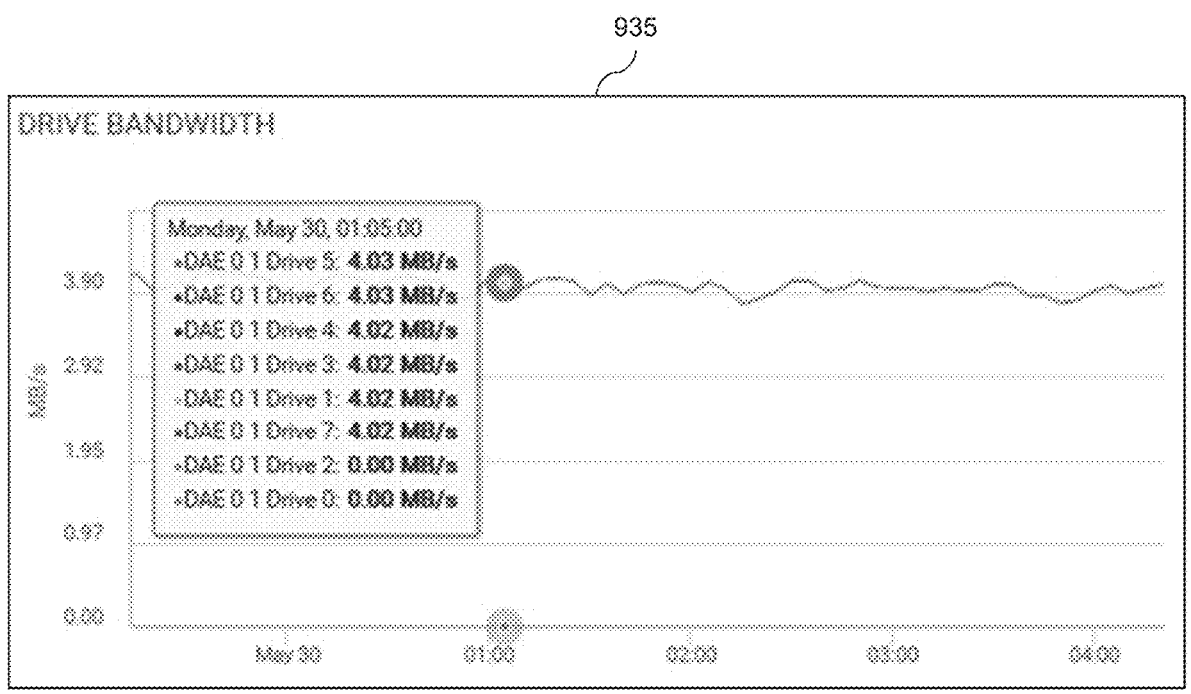

Different applications may run storage workloads having varying IO characteristics. Thus, to analyze and tune performance of a storage system, it is important to understand the types of storage workloads that applications or hosts utilizing the storage system are generating. Storage workloads may be described in terms of various characteristics, including but not limited to IO size, read/write ratio, random/sequential ratio, etc. Different applications, such as a web file server, a web server log, operating system (OS) paging, exchange server, workstation, media streaming, online transaction processing (OLTP) data, and OLTP logging, may have different storage workloads. FIG. 3 shows a table 300 illustrating different characteristics (IO size, read/write ratio and random/sequential ratio) for such different applications. The web server logging application, for example, may have an IO size of 8 kilobytes (KB), a read/write ratio of 100% write, and a random/sequential ratio of 100% random. The media streaming application has an IO size of 64 KB, a read/write ratio of 98% read and 2% write, and a random/sequential ratio of 100% sequential. The OLTP logging application has an IO size of 512 bytes (B) to 64 KB, a read/write ratio of 100% write, and a random/sequential ratio of 100% random. It should be noted that these particular applications and their associated storage workload characteristics are presented by way of example only, and that in other embodiments there may be various other types of applications with different values for their associated storage workload characteristics.

To determine write penalty results, a number of different IO patterns are analyzed, including:
  IO pattern P1-05K_100 W_0 S (0.5 KB IO size, 100% write ratio and 0% sequential IO ratio);
  IO pattern P2-05K_100 W_100 S (0.5 KB IO size, 100% write ratio and 100% sequential IO ratio);
  IO pattern P3-4K_100 W_0 S (4 KB IO size, 100% write ratio and 0% sequential IO ratio);
  IO pattern P4-4K_100 W_100 S (4 KB IO size, 100% write ratio and 100% sequential IO ratio);
  IO pattern P5-64K_100 W_0 S (64 KB IO size, 100% write ratio and 0% sequential IO ratio); and
  IO pattern P6-64K_100 W_100 S (64 KB IO size, 100% write ratio and 100% sequential IO ratio).

Write penalties may be determined by analyzing a storage system with three storage tiers (e.g., an extreme performance flash/SSD storage tier, a performance SAS storage tier, and a capacity NL-SAS storage tier). In this storage system, the SSD disks' block size is 512 B, while the SAS and NL-SAS disks' block size is 4 KB. On each of the storage tiers, a mapped RAID group (e.g., with RAID level 6) is created. Each RAID group is composed of 8 disks of the storage tier, and storage objects are created using the six IO patterns described above on each RAID group. FIGS. 4A-9H show results of such storage object creation for the six different IO patterns.

FIGS. 4A, 5A, 6A, 7A, 8A and 9A show plots 400, 500, 600, 700, 800 and 900 of LUN IOPS over time for the IO patterns P1-P6, respectively, on each of the extreme performance, the performance and the capacity storage tiers. FIGS. 4B, 5B, 6B, 7B, 8B and 9B show plots 405, 505, 605, 705, 805 and 905 of LUN bandwidth over time for the IO patterns P1-P6, respectively, on each of the extreme performance, the performance and the capacity storage tiers. FIGS. 4C, 5C, 6C, 7C, 8C and 9C show respective plots 410, 510, 610, 710, 810 and 910 of drive IOPS over time for the IO patterns P1-P6, respectively, for SSD drives on the extreme performance storage tier. FIGS. 4D, 5D, 6D, 7D, 8D and 9D show respective plots 415, 515, 615, 715, 815 and 915 of drive bandwidth over time for the IO patterns P1-P6, respectively, for SSD drives on the extreme performance storage tier. FIGS. 4E, 5E, 6E, 7E, 8E and 9E show respective plots 420, 520, 620, 720, 820 and 920 of drive IOPS over time for the IO patterns P1-P6, respectively, for SAS drives on the performance storage tier. FIGS. 4F, 5F, 6F, 7F, 8F and 9F show respective plots 425, 525, 625, 725, 825 and 925 of drive bandwidth over time for the IO patterns P1-P6, respectively, for SAS drives on the performance storage tier. FIGS. 4G, 5G, 6G, 7G, 8G and 9G show respective plots 430, 530, 630, 730, 830 and 930 of drive IOPS over time for the IO patterns P1-P6, respectively, for NL-SAS drives on the capacity storage tier. FIGS. 4H, 5H, 6H, 7H, 8H and 9H show respective plots 435, 535, 635, 735, 835 and 935 of drive bandwidth over time for the IO patterns P1-P6, respectively, for NL-SAS drives on the capacity storage tier.

As can be seen from the plots of FIGS. 4A-9H, the different IO patterns P1-P6 have different write penalties for different types of backend drives. FIG. 10 shows a table 1000 summarizing the plots of FIGS. 4A-9H. The table 1000 includes columns for the IO pattern, storage tier, storage object IOPS, object bandwidth, disk IOPS, disk bandwidth, IOPS penalty and bandwidth penalty. The object IOPS and object bandwidth metrics are the storage object IOPS and bandwidth, while the disk IOPS and disk bandwidth metrics are sums of all the disks' IOPS and bandwidth for each of the storage tiers. For an IO request from the application layer that is flushed on disks, the IOPS penalty and bandwidth penalty are calculated according to the following equations:

$$IOPS\ Penalty = \frac{Disk\ IOPS}{Object\ IOPS}$$

$$Bandwidth\ Penalty = \frac{Disk\ Bandwidth}{Object\ Bandwidth}$$

From the table 1000, it can be seen that the different IO patterns P1-P6 have different write penalties on each storage tier from the IOPS and bandwidth view. Random and small IO requests have heavier write penalties, especially for NL-SAS drives on the capacity storage tier. Sequential and large IO requests have lighter write penalties on each of the storage tiers.

FAST-VP relocation approaches which are based on data IO activity alone do not consider the data's associated IO pattern write penalty impact on the storage system. As can be seen from FIGS. 4A-10, different IO patterns have different backend write penalty results for different storage tiers. For those IO patterns which have a significant write penalty on a given storage tier, relocation of data exhibiting such IO patterns to the given storage tier will have a big backend write penalty which will degrade the overall storage system IO performance. Some IO patterns have similar write penalties on different storage tiers, while other IO patterns have different write penalties (e.g., in some cases, large differences) on different storage tiers. The technical solutions described herein enable FAST-VP relocation mechanisms to consider IO activity but also the IO write penalty to the backend to use storage disks more reasonably.

The technical solutions described herein enable a FAST-VP relocation algorithm to consider both IO access frequency and IO write penalty. In some embodiments, backend IOPS and bandwidth penalties are combined and used along with slice or other storage object IO access frequency to guide the FAST-VP relocation algorithm to relocate data to the proper storage tier and improve overall storage system performance. For those storage objects exhibiting IO patterns with a small (e.g., less than some designated threshold) write penalty difference between neighboring storage tiers, the FAST-VP relocation algorithm may consider IO activity alone. For those storage objects exhibiting IO patterns with a large (e.g., greater than some designated threshold) write penalty difference between neighboring storage tiers, the FAST-VP relocation algorithm may consider IO activity as well as write penalty. Storage objects exhibiting IO patterns with large or obvious write penalty difference may be relocated to storage tiers with relatively smaller write penalties while also taking into account IO activity level to avoid significant write penalty impact (e.g., which would be encountered when moving the storage objects to another storage tier) on the storage system IO performance.

In some embodiments, a FAST-VP or other type of storage object relocation algorithm is configured to consider slice or other storage object IO frequency as well as IO pattern write penalty impact to backend disks. If the target storage tier i for a given slice or other storage object is proper based on the given slice or other storage object's IO frequency, but the storage tier i has a heavy write penalty for the IO pattern exhibited by the given slice or other storage object, then the given slice or other storage object should be relocated to another storage tier with a relatively lower write penalty for the IO pattern exhibited by the given slice or other storage object. The technical solutions described herein may generate comprehensive scores for slices or other storage objects, where the comprehensive scores combine IO frequency and IO pattern write penalty factors. The slices or other storage objects are then sorted according to their respective comprehensive scores. Slices or storage objects with higher comprehensive scores have a chance to be promoted to higher performance storage tiers, while slices or storage objects with relatively lower comprehensive scores may be moved to relatively lower performance storage tiers. Thus, the comprehensive scores may be used to generate a slice or other storage object relocation guide which causes fewer backend writes and improved storage system performance.

Assume that there are K storage tiers in a storage system, where K≥1. In the description below, it is assumed that K=3 and the storage tiers include: Tier 1—an extreme performance storage tier (e.g., with SAS Flash, SSD or NVMe drives); Tier 2—a performance storage tier (e.g., with SAS drives); and Tier 3—a capacity storage tier (e.g., with NL-SAS drives or low-cost cloud storage). Storage objects (e.g., LUNs, filesystems (FSs), datastores, etc.) may be configured for special usage points by a user and used by stable applications with specific IO patterns as illustrated in the table 300 of FIG. 3. If the storage objects' IO patterns are relatively stable (e.g., they remain constant over at least some designated threshold period of time), then the IO patterns for the storage objects can be statistically analyzed.

In the description below, the following notation is used. T denotes the IO pattern collection and statistic time period, and N denotes the total number of storage object relocation units. $P_j$ denotes an IO pattern j. $O_{Ij,k}$ denotes the storage object IOPS on storage tier k of IO pattern $P_j$, $O_{Bj,k}$ denotes the storage object bandwidth on storage tier k of IO pattern $P_j$, $D_{Ij,k}$ denotes the backend disk IOPS on storage tier k of IO pattern $P_j$, and $D_{Bj,k}$ denotes the backend disk bandwidth on storage tier k of IO pattern $P_j$. $A_{Ij,k}$ denotes the backend write penalty of IO pattern $P_j$ from the IOPS view, $RA_{Ij,k}$ denotes the normalized IOPS write penalty for IO pattern $P_j$ in the K storage tiers, and $\sigma_I$ denotes the IOPS write penalty standard deviation among the K storage tiers. $A_{Bj,k}$ denotes the backend write penalty of IO pattern $P_j$ from the bandwidth view, $RA_{Bj,k}$ denotes the normalized bandwidth write penalty for IO pattern $P_j$ in the K storage tiers, and $\sigma_B$ denotes the bandwidth write penalty standard deviation among the K storage tiers. $\sigma_1$ denotes the comprehensive write penalty standard deviation among the K storage tiers. $s_{ij}$ denotes the comprehensive score of a storage object relocation unit, which combines IO activity and write penalty factors.

To begin, storage objects' IO patterns are recognized for an array cluster or other storage system. IO patterns may be collected in a statistical way. Though analyzing IO statistics for a time period T, the IO pattern type for a storage object may be determined based on factors such as: IO size ($P_{size}$); IO read/write ratio ($P_{rw}$); and IO sequential/random ratio ($P_{sr}$). A storage object's IO size and IO read/write ratio may be obtained from the storage system (e.g., from metrics data collected from the storage system).

Sequential IO refers to IO operations with starting storage locations (e.g., logical block addresses (LBAs)) that follow directly after the storage locations of preceding IO operations. Random IO, in contrast, refers to IO operations whose starting storage locations are not contiguous with storage locations of preceding IO operations. A storage object's IO sequential/random ratio may be statistically calculated by recording the total number IO operations for a time period T as $N_{total}$, recording the total number of sequential IO operations for the time period T as $N_s$, and recording the total number of random IO operations for the time period T as $N_r$. The IO sequential/random ratio is then calculated as $P_{sr}=N_s/N_{total}$.

An IO pattern may be described with the format [IO Size]_[IO Read Ratio]_[IO Sequential Ratio]. This is illustrated for the IO patterns P1-P6 described above with respect to FIGS. 4A-10. A storage object $o_i$ may exhibit different kinds of IO patterns. For each type of IO pattern exhibited by the storage object $o_i$, the ratio of that IO pattern $P_{i,j}$: $RP_{i,j}=P_{i,j}/\text{sum}(P_{i,j})$. Let the threshold of IO patterns ratio be θ. Storage objects can then be classified into two types based on whether $RP_{i,j}$ is greater or less than θ. If $RP_{i,j}<\theta$, then the storage object $o_i$ has discrete IO patterns which are not stable and change irregularly. If $RP_{i,j}\geq\theta$, then the storage object $o_i$ has a stable IO pattern $P_j$. For storage objects where $RP_{i,j}<\theta$, IO access frequency alone may be used for relocation decisions. For storage objects where $RP_{i,j}\geq\theta$, the IO access frequency and write penalty (e.g., the write penalty for the specific IO pattern $P_j$) may be used for relocation decisions.

IO patterns are also measured and analyzed to determine write penalty differences. In some embodiments, IOPS and bandwidth factors are used to analyze the backend write penalty for IO patterns on different storage tiers. $O_{Ij,k}$ is used to denote the storage object IOPS on storage tier k for IO pattern $P_j$, $O_{Bj,k}$ is used to denote the storage object bandwidth on storage tier k for IO pattern $P_j$, $D_{Ij,k}$ is used to denote the backend disk IOPS on storage tier k for IO pattern $P_j$, and $D_{Bj,k}$ is used to denote the backend disk bandwidth on storage tier k for IO pattern $P_j$.

From the IOPS view, the backend write penalty of IO pattern $P_1$ can be calculated according to:

$$A_{Ij,k} = \frac{D_{Ij,k}}{O_{Ij,k}}$$

Because the IOPS write penalty is negative to the storage system, $A_{Ij,k}$ is inversed first and then normalized to determine the IO pattern $P_1$ IOPS write penalty in K storage tiers according to:

$$RA_{Ij,k} = \frac{1/A_{Ij,k}}{\sum_{k=1}^{K} 1/A_{Ij,k}} = \frac{O_{Ij,k}/D_{Ij,k}}{\sum_{k=1}^{K} O_{Ij,k}/D_{Ij,k}}$$

The normalized average write penalty is $$avg(RA_{Ij,k}) = \frac{1}{K},$$

and the IOPS write penalty standard deviation among K storage tiers is determined according to:

$$\sigma_I = \sqrt{\frac{\sum_{k=1}^{K}(RA_{Ij,k} - avg(RA_{Ij,k}))^2}{K}}$$

From the bandwidth view, the backend write penalty of IO pattern $P_j$ can be calculated according to:

$$A_{Bj,k} = \frac{D_{Bj,k}}{O_{Bj,k}}$$

The bandwidth write penalty is also negative to the storage system, so $RA_{Bj,k}$ is inversed first and then normalized to determine the IO pattern $P_j$ bandwidth write penalty in K storage tiers according to:

$$RA_{Bj,k} = \frac{1/A_{Bj,k}}{\sum_{k=1}^{K} 1/A_{Bj,k}} = \frac{O_{Bj,k}/D_{Bj,k}}{\sum_{k=1}^{K} O_{Bj,k}/D_{Bj,k}}$$

The normalized average write penalty is $$avg(RA_{Bj,k}) = \frac{1}{K},$$

and the IOPS write penalty standard deviation among K storage tiers is determined according to:

$$\sigma_B = \sqrt{\frac{\sum_{k=1}^{K}(RA_{Bj,k} - avg(RA_{Bj,k}))^2}{K}}$$

The IOPS penalty weight is denoted as $w_I$, and the bandwidth penalty weight is denoted as $w_B$, where $w_I+w_B=1$. For IO pattern $P_j$, the comprehensive write penalty standard deviation on K storage tiers may be determined according to:

$$\sigma_j = w_I \cdot \sigma_I + w_B \cdot \sigma_B =$$

$$w_I \cdot \sqrt{\frac{\sum_{k=1}^{K}(RA_{Ij,k} - avg(RA_{Ij,k}))^2}{K}} + w_B \cdot \sqrt{\frac{\sum_{k=1}^{K}(RA_{Bj,k} - avg(RA_{Bj,k}))^2}{K}}$$

A storage object or other storage relocation unit's IO activity is then combined with the write penalty factor (e.g., for the IO pattern exhibited by that storage object or other storage relocation unit). A storage relocation unit is denoted $u_i$, and is assumed to have a stable IO pattern $P_j$. The number of storage relocation units is N, where $1 \leq i \leq N$. The access count of $u_i$ is denoted ct. A tiering policy for $u_i$ can be evaluated in multiple dimensions, including write penalty and IO activity. IO activity may be determined as the number of access times in a last time period T, and the IO pattern write penalty ratio may be determined as described above. For $\sigma_j$ with a small value (e.g., less than some designated threshold), that means the IO pattern $P_j$ has no obvious or significant write penalty difference among the K storage tiers, and the relocation may be guided solely or primarily using the IO activity factor. For $\sigma_j$ with a large value (e.g., greater than some designated threshold), that means the IO pattern $P_j$ has an obvious or significant write penalty difference among the K storage tiers, and the relocation may be guided based on both write penalty impact and IO activity.

The comprehensive score of each relocation unit combines IO activity and write penalty factors, and may be determined according to:

$$s_{ij} = c_i * (1 + \sigma_j)$$

If the value of $s_{ij}$ is greater (e.g., than some designated threshold), then the comprehensive score for $u_i$ is high and $u_i$ should be promoted to a higher performance one of the storage tiers k. This will provide various benefits to the storage system, including improved IO performance and reduced backend write penalty.

Figure 11:
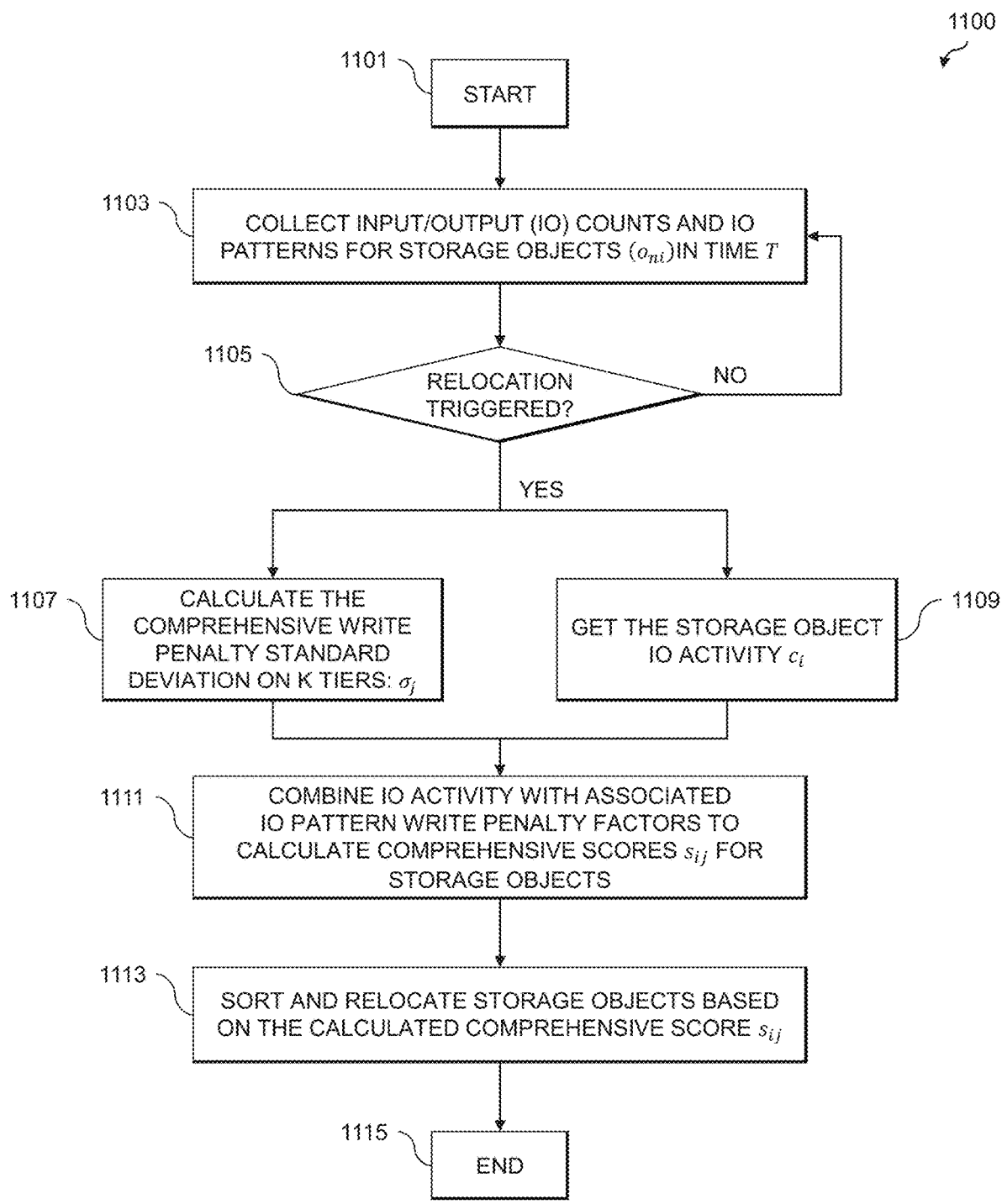
FIG. 11 shows a process flow for generating a relocation guide for storage objects based on input/output activity and write penalty factors in an illustrative embodiment.

FIG. 11 shows a process flow 1100 for generating a relocation guide for storage relocation units (e.g., slices or other storage objects) which takes into account both IO activity and write penalty factors. The process flow 1100 starts in step 1101. In step 1103, storage objects' ($o_{ni}$) IO patterns (e.g., using IO size, IO read/write ratio and IO random/sequential ratio) and IO count are collected for time period T. In step 1105, a determination is made as to whether storage object relocation has been triggered. If the result of the step 1105 determination is no, the process flow 1100 returns to step 1103. If the result of the step 1105 determination is yes, the process flow 1100 continues to steps 1107 and 1109. In step 1107, the comprehensive write penalty standard deviation on K storage tiers, $\sigma_j$, is calculated. In step 1109, the storage object's IO activity, $c_i$, is calculated. In step 1111, the storage objects' IO activity and associated IO pattern write penalty factors are combined to calculate comprehensive scores $s_{ij}$. In step 1113, the storage objects are then sorted based on the calculated comprehensive scores $s_{ij}$, and used to generate a relocation guide for relocating the storage objects. The process flow 1100 then ends in step 1115.

An example implementation of the process flow 1100 will now be described, assuming that there are six relocation unit storage objects on a storage system. In this implementation, the IOPS weight is set as $w_I=0.5$, and the bandwidth weight is set as $w_B=0.5$. Here, storage objects with comprehensive scores above 100 are selected for relocation to a flash/SSD or extreme performance storage tier, storage objects with comprehensive scores between 80 and 100 are selected for relocation to an SAS or performance storage tier, and storage objects with comprehensive scores under 80 are selected for relocation to an NL-SAS or capacity storage tier. Each of the storage objects may have different IO patterns, IO activity and current storage tiers. FIG. 12 shows a table 1200 summarizing such information for the set of six storage object relocation units denoted $u_1, u_2, \ldots u_6$.

Figure 15A:
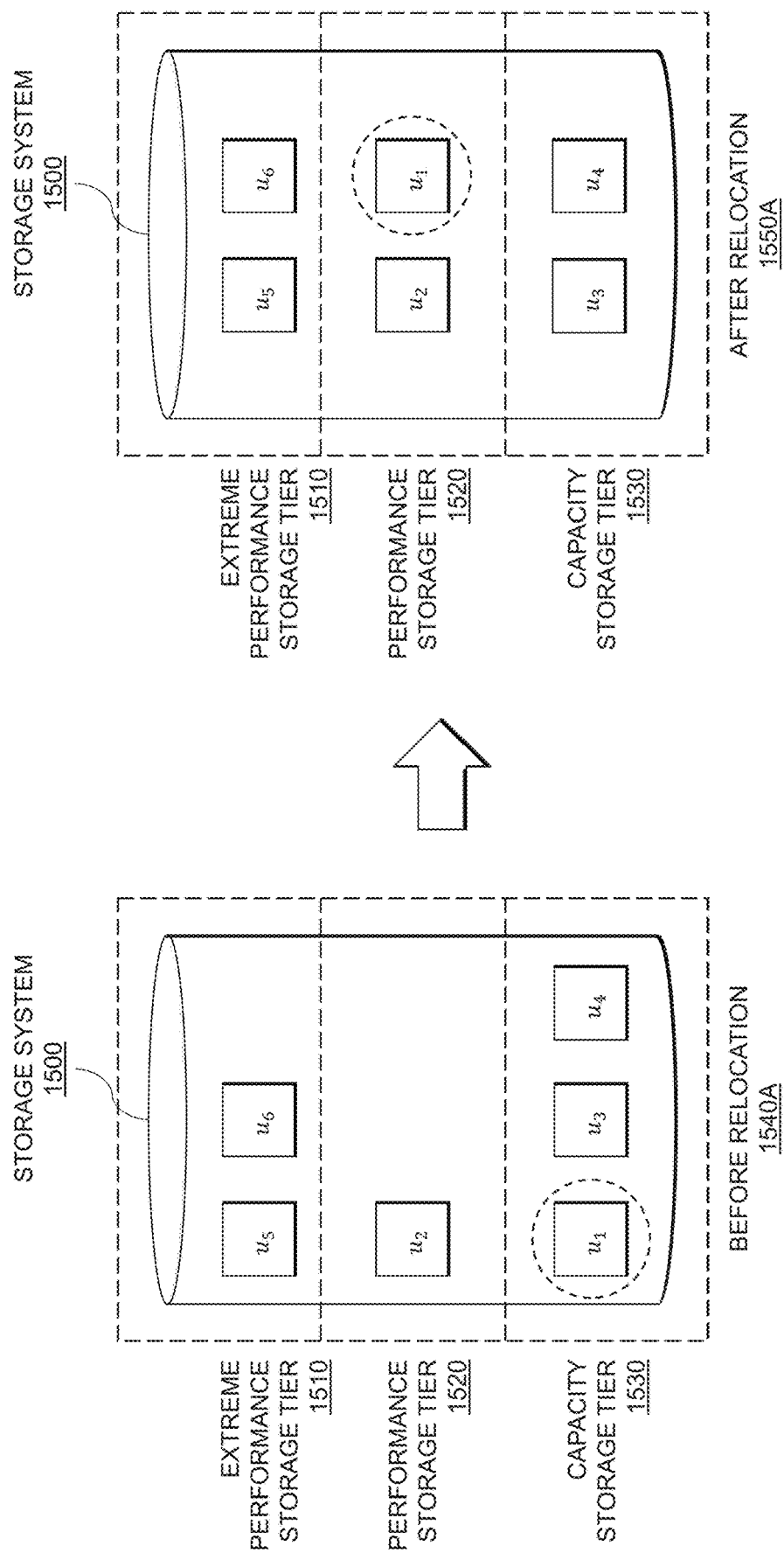
FIGS. 15A and 15B show a set of storage objects on different storage tiers of a storage system before and after relocation without and with consideration of input/output pattern write penalties in an illustrative embodiment.
Figure 15B:
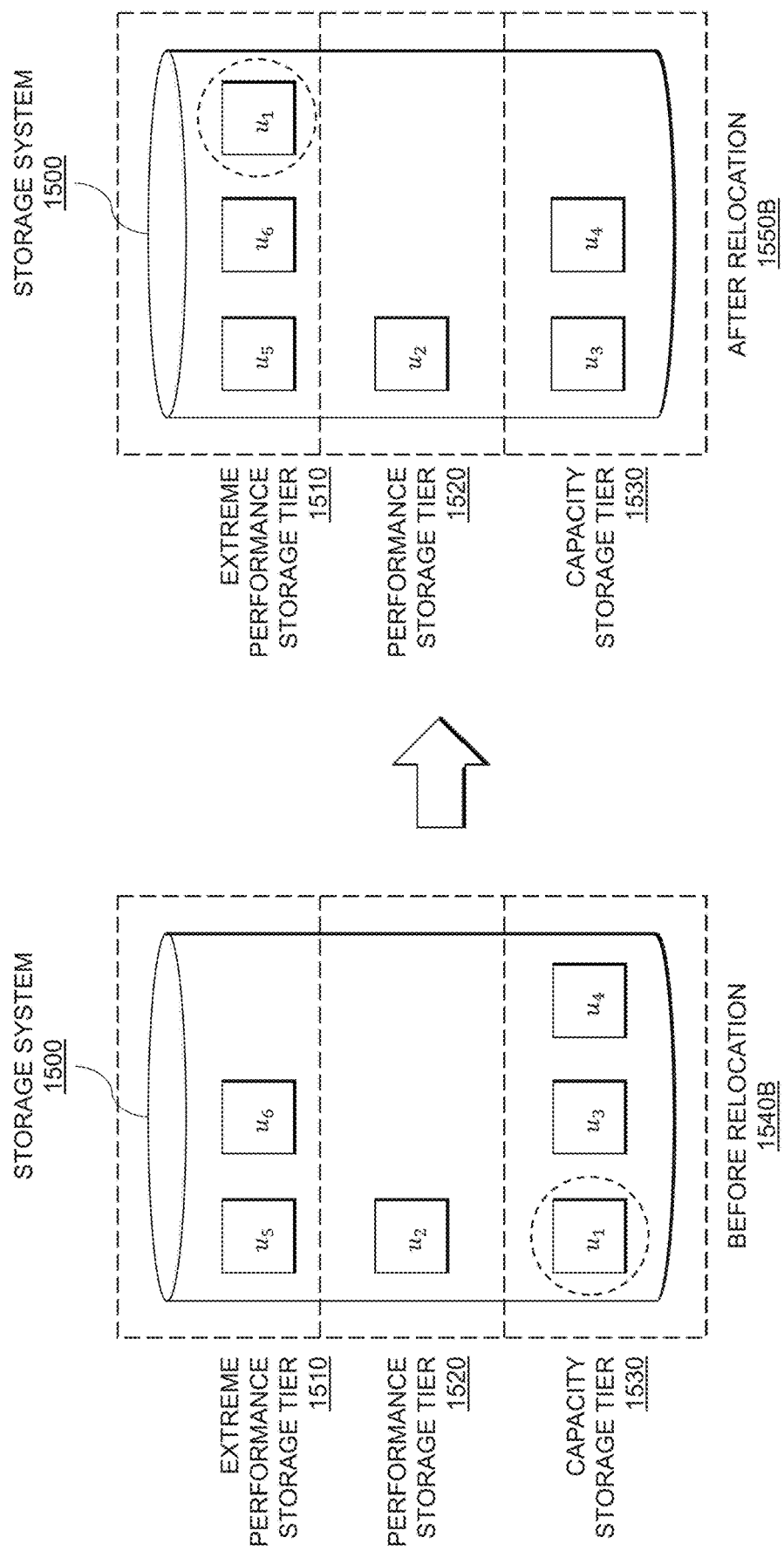

FIG. 13 shows a table 1300 where the IOPS penalty, bandwidth penalty, and comprehensive write penalty among the K storage tiers (e.g., the SSD, SAS and NL-SAS storage tiers) are determined for the different IO patterns, along with the standard deviation $\sigma_j$. FIG. 14 shows a table 1400, which supplements the table 1100 with additional columns including: a relocation recommendation taking into account IO activity alone, comprehensive scores $s_{ij}$, and a relocation recommendation taking into account IO activity and write penalty. Here, for the relocation unit $u_1$, the IO activity alone is not high enough to recommend movement to the SSD storage tier, and hence its relocation recommendation based on IO activity alone is to relocate $u_1$ to the SAS storage tier. The relocation unit $u_1$, however, has a high write penalty for the SAS storage tier, and thus the relocation recommendation which takes into account both IO activity and write penalty recommends relocating $u_1$ to the SSD storage tier which will improve overall storage system performance. FIGS. 15A and 15B show a storage system 1500 before and after relocation among an extreme performance storage tier 1510 (e.g., a flash/SSD storage tier), a performance storage tier 1520 (e.g., an SAS storage tier) and a capacity storage tier 1530 (e.g., an NL-SAS storage tier). FIG. 15A shows the storage system 1500 before relocation 1540A and after relocation 1550A, where the relocation unit $u_1$ is relocated to the performance storage tier 1520 in accordance with the recommendation which does not take into account write penalty. FIG. 15B shows the storage system 1500 before relocation 1540B and after relocation 1550B, where the relocation unit $u_1$ is relocated to the extreme performance storage tier 1510 in accordance with the recommendation which does take into account write penalty.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for data movement in a storage system based at least in part on write penalties of IO patterns associated with storage objects will now be described in greater detail with reference to FIGS. 16 and 17. Although described in the context of system 100, these platforms may also be used to implement at least portions of other information processing systems in other embodiments.

Figure 16:
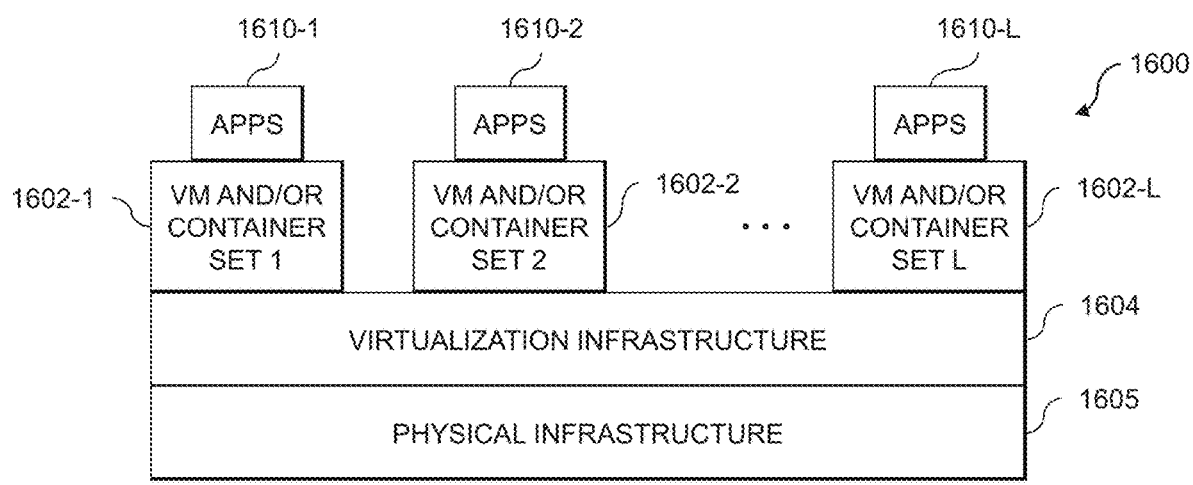
FIGS. 16 and 17 show examples of processing platforms that may be utilized to implement at least a portion of an information processing system in illustrative embodiments.
Figure 17:
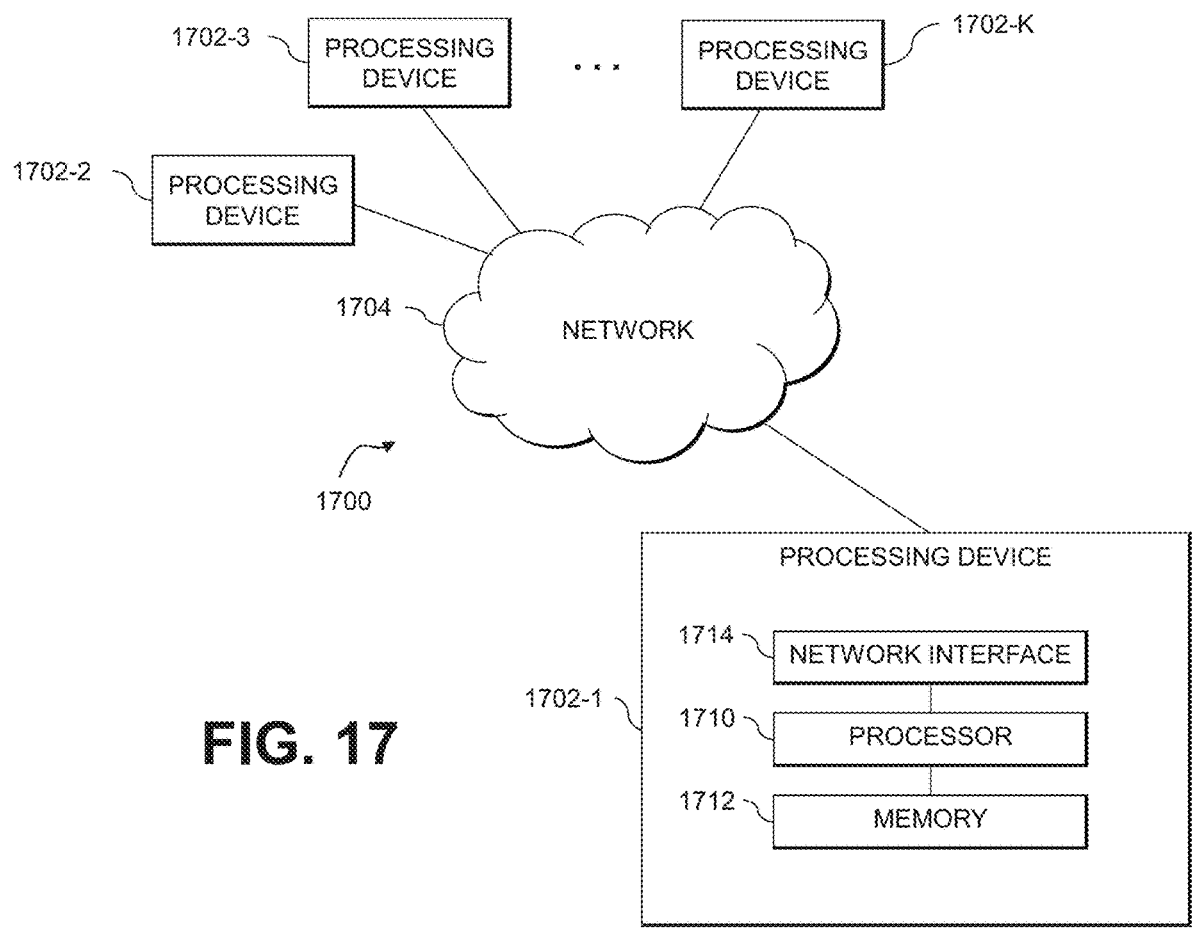

FIG. 16 shows an example processing platform comprising cloud infrastructure 1600. The cloud infrastructure 1600 comprises a combination of physical and virtual processing resources that may be utilized to implement at least a portion of the information processing system 100 in FIG. 1. The cloud infrastructure 1600 comprises multiple virtual machines (VMs) and/or container sets 1602-1, 1602-2, ... 1602-L implemented using virtualization infrastructure 1604. The virtualization infrastructure 1604 runs on physical infrastructure 1605, and illustratively comprises one or more hypervisors and/or operating system level virtualization infrastructure. The operating system level virtualization infrastructure illustratively comprises kernel control groups of a Linux operating system or other type of operating system.

The cloud infrastructure 1600 further comprises sets of applications 1610-1, 1610-2, ... 1610-L running on respective ones of the VMs/container sets 1602-1, 1602-2, ... 1602-L under the control of the virtualization infrastructure 1604. The VMs/container sets 1602 may comprise respective VMs, respective sets of one or more containers, or respective sets of one or more containers running in VMs.

In some implementations of the FIG. 16 embodiment, the VMs/container sets 1602 comprise respective VMs implemented using virtualization infrastructure 1604 that comprises at least one hypervisor. A hypervisor platform may be used to implement a hypervisor within the virtualization infrastructure 1604, where the hypervisor platform has an associated virtual infrastructure management system. The underlying physical machines may comprise one or more distributed processing platforms that include one or more storage systems.

In other implementations of the FIG. 16 embodiment, the VMs/container sets 1602 comprise respective containers implemented using virtualization infrastructure 1604 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1600 shown in FIG. 16 may represent at least a portion of one processing platform. Another example of such a processing platform is processing platform 1700 shown in FIG. 17.

The processing platform 1700 in this embodiment comprises a portion of system 100 and includes a plurality of processing devices, denoted 1702-1, 1702-2, 1702-3, ... 1702-K, which communicate with one another over a network 1704.

The network 1704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1702-1 in the processing platform 1700 comprises a processor 1710 coupled to a memory 1712.

The processor 1710 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1712 may comprise random access memory (RAM), read-only memory (ROM), flash memory or other types of memory, in any combination. The memory 1712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1702-1 is network interface circuitry 1714, which is used to interface the processing device with the network 1704 and other system components, and may comprise conventional transceivers.

The other processing devices 1702 of the processing platform 1700 are assumed to be configured in a manner similar to that shown for processing device 1702-1 in the figure.

Again, the particular processing platform 1700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for data movement in a storage system based at least in part on write penalties of IO patterns associated with storage objects as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, storage systems, IO patterns, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing device comprising a processor coupled to a memory;
   the at least one processing device being configured to perform steps of:
   determining, based at least in part on monitoring input/output operations for a given storage object for a designated period of time, an input/output activity level and a given input/output pattern of the given storage object for the designated period of time, the given storage object being stored utilizing a first type of storage resources associated with a first one of two or more storage tiers in a storage system;
   determining a write penalty of the given input/output pattern, the write penalty of the given input/output pattern being associated with writing storage objects having the given input/output pattern to at least a second type of storage resources associated with a second one of the two or more storage tiers in the storage system;
   determining a predicted performance difference of the storage system which would result from movement of the given storage object from being stored utilizing the second type of storage resources associated with the second one of the two or more storage tiers;
   determining, based at least in part on the input/output activity level of the given storage object, the write penalty of the given input/output pattern, the predicted performance difference and a designated write penalty offset threshold, whether to move the given storage object from being stored utilizing the first type of storage resources associated with the first one of the two or more storage tiers in the storage system to being stored utilizing the second type of storage resources associated with the second one of the two or more storage tiers in the storage system; and
   moving, responsive to an affirmative movement determination, the given storage object to the second type of storage resources associated with the second one of the two or more storage tiers in the storage system.

2. The apparatus of claim 1 wherein the input/output activity level of the given storage object is determined based at least in part on a count of the monitored input/output operations for the given storage object for the designated period of time.

3. The apparatus of claim 1 wherein the given input/output pattern associated with the given storage object is determined based at least in part on:
   a size of the given storage object;
   a ratio of read operations to write operations for the given storage object for the designated period of time; and
   a ratio of sequential input/output operations to random input/output operations involving the given storage object for the designated period of time.

4. The apparatus of claim 1 wherein determining the write penalty of the given input/output pattern comprises evaluating write performance of a set of storage objects having the given input/output pattern that are written to the second type of storage resources associated with the second one of the two or more storage tiers in the storage system.

5. The apparatus of claim 1 wherein the at least one processing device is further configured to perform the step of determining another write penalty associated with writing storage objects having the given input/output pattern to a third type of storage resources associated with a third one of the two or more storage tiers in the storage system.

6. The apparatus of claim 5 wherein determining whether to move the given storage object from being stored utilizing the first type of storage resources associated with the first one of the two or more storage tiers in the storage system further comprises selecting, based at least in part on the write penalties associated with writing storage objects having the given input/output pattern to the second and third types of storage resources associated with the second and third ones of the two or more storage tiers in the storage system, whether to move the given storage object to being stored utilizing the second type of storage resources associated with the second one of the two or more storage tiers in the storage system or the third type of storage resources associated with the third one of the two or more storage tiers in the storage system.

7. The apparatus of claim 1 wherein determining whether to move the given storage object from being stored utilizing the first type of storage resources associated with the first one of the two or more storage tiers in the storage system to being stored utilizing the second type of storage resources associated with the second one of the two or more storage tiers in the storage system is responsive to determining that a predicted performance improvement of the storage system which would result from movement of the given storage object from being stored utilizing the first type of storage resources associated with the first one of the two or more storage tiers in the storage system offsets at least a designated threshold amount of the determined write penalty, the designated threshold amount being based at least in part on the designated write penalty offset threshold.

8. The apparatus of claim 1 wherein the first one of the two or more storage tiers in the storage system provides a first performance level that is less than a second performance level provided by the second one of the two or more storage tiers in the storage system.

9. The apparatus of claim 8 wherein determining whether to move the given storage object from being stored utilizing the first type of storage resources associated with the first one of the two or more storage tiers in the storage system to being stored utilizing the second type of storage resources associated with the second one of the two or more storage tiers in the storage system is responsive to determining that the input/output activity level of the given storage object provides at least a designated threshold performance improvement.

10. The apparatus of claim 8 wherein determining whether to move the given storage object from being stored utilizing the first type of storage resources associated with the first one of the two or more storage tiers in the storage system to being stored utilizing the second type of storage resources associated with the second one of the two or more storage tiers in the storage system is responsive to determining that the input/output activity level of the given storage object provides at least a designated threshold performance improvement that offsets at least a designated threshold amount of the determined write penalty, the designated threshold amount being based at least in part on the designated write penalty offset threshold.

11. The apparatus of claim 1 wherein the first one of the two or more storage tiers in the storage system provides a first performance level that is greater than a second performance level provided by the second one of the two or more storage tiers in the storage system.

12. The apparatus of claim 11 wherein determining whether to move the given storage object from being stored utilizing the first type of storage resources associated with the first one of the two or more storage tiers in the storage system to being stored utilizing the second type of storage resources associated with the second one of the two or more storage tiers in the storage system is responsive to determining that the input/output activity level of the given storage object provides at least a designated threshold performance savings for the first one of the two or more storage tiers in the storage system.

13. The apparatus of claim 11 wherein determining whether to move the given storage object from being stored utilizing the first type of storage resources associated with the first one of the two or more storage tiers in the storage system to being stored utilizing the second type of storage resources associated with the second one of the two or more storage tiers in the storage system is responsive to determining that the input/output activity level of the given storage object provides at least a designated threshold performance savings for the first one of the two or more storage tiers in the storage system that offsets at least a designated threshold amount of the determined write penalty, the designated threshold amount being based at least in part on the designated write penalty offset threshold.

14. The apparatus of claim 1 wherein the storage system comprises a clustered storage system comprising two or more storage arrays, and wherein a first one of the two or more storage arrays provides at least a portion of the first type of storage resources associated with the first one of the two or more storage tiers in the storage system and a second one of the two or more storage arrays provides at least a portion of the second type of storage resources associated with the second one of the two or more storage tiers in the storage system.

15. A computer program product comprising a non-transitory processor-readable storage medium having stored therein program code of one or more software programs, wherein the program code when executed by at least one processing device causes the at least one processing device to perform steps of:
  determining, based at least in part on monitoring input/output operations for a given storage object for a designated period of time, an input/output activity level and a given input/output pattern of the given storage object for the designated period of time, the given storage object being stored utilizing a first type of storage resources associated with a first one of two or more storage tiers in a storage system;
  determining a write penalty of the given input/output pattern, the write penalty of the given input/output pattern being associated with writing storage objects having the given input/output pattern to at least a second type of storage resources associated with a second one of the two or more storage tiers in the storage system;
  determining a predicted performance difference of the storage system which would result from movement of the given storage object from being stored utilizing the second type of storage resources associated with the second one of the two or more storage tiers;
  determining, based at least in part on the input/output activity level of the given storage object, the write penalty of the given input/output pattern, the predicted performance difference and a designated write penalty offset threshold, whether to move the given storage object from being stored utilizing the first type of storage resources associated with the first one of the two or more storage tiers in the storage system to being stored utilizing the second type of storage resources associated with the second one of the two or more storage tiers in the storage system; and
  moving, responsive to an affirmative movement determination, the given storage object to the second type of storage resources associated with the second one of the two or more storage tiers in the storage system.

16. The computer program product of claim 15 wherein the given input/output pattern associated with the given storage object is determined based at least in part on:
   a size of the given storage object;
   a ratio of read operations to write operations for the given storage object for the designated period of time; and
   a ratio of sequential input/output operations to random input/output operations involving the given storage object for the designated period of time.

17. The computer program product of claim 15 wherein determining whether to move the given storage object from being stored utilizing the first type of storage resources associated with the first one of the two or more storage tiers in the storage system to being stored utilizing the second type of storage resources associated with the second one of the two or more storage tiers in the storage system is responsive to determining that a predicted performance improvement of the storage system which would result from movement of the given storage object from being stored utilizing the first type of storage resources associated with the first one of the two or more storage tiers in the storage system offsets at least a designated threshold amount of the determined write penalty, the designated threshold amount being based at least in part on the designated write penalty offset threshold.

18. A method comprising:
   determining, based at least in part on monitoring input/output operations for a given storage object for a designated period of time, an input/output activity level and a given input/output pattern of the given storage object for the designated period of time, the given storage object being stored utilizing a first type of storage resources associated with a first one of two or more storage tiers in a storage system;
   determining a write penalty of the given input/output pattern, the write penalty of the given input/output pattern being associated with writing storage objects having the given input/output pattern to at least a second type of storage resources associated with a second one of the two or more storage tiers in the storage system;
   determining a predicted performance difference of the storage system which would result from movement of the given storage object from being stored utilizing the second type of storage resources associated with the second one of the two or more storage tiers;
   determining, based at least in part on the input/output activity level of the given storage object, the write penalty of the given input/output pattern, the predicted performance difference and a designated write penalty offset threshold, whether to move the given storage object from being stored utilizing the first type of storage resources associated with the first one of the two or more storage tiers in the storage system to being stored utilizing the second type of storage resources associated with the second one of the two or more storage tiers in the storage system; and
   moving, responsive to an affirmative movement determination, the given storage object to the second type of storage resources associated with the second one of the two or more storage tiers in the storage system;
   wherein the method is performed by at least one processing device comprising a processor coupled to a memory.

19. The method of claim 18 wherein the given input/output pattern associated with the given storage object is determined based at least in part on:
   a size of the given storage object;
   a ratio of read operations to write operations for the given storage object for the designated period of time; and
   a ratio of sequential input/output operations to random input/output operations involving the given storage object for the designated period of time.

20. The method of claim 18 wherein determining whether to move the given storage object from being stored utilizing the first type of storage resources associated with the first one of the two or more storage tiers in the storage system to being stored utilizing the second type of storage resources associated with the second one of the two or more storage tiers in the storage system is responsive to determining that a predicted performance improvement of the storage system which would result from movement of the given storage object from being stored utilizing the first type of storage resources associated with the first one of the two or more storage tiers in the storage system offsets at least a designated threshold amount of the determined write penalty, the designated threshold amount being based at least in part on the designated write penalty offset threshold.

\* \* \* \* \*